(12) United States Patent
Yaakoby

(10) Patent No.: US 9,963,968 B2
(45) Date of Patent: May 8, 2018

(54) TIMED GAS EXCHANGE IN ENGINE USING PISTON AS EXHAUST VALVE

(71) Applicant: Aquarius Engines (A.M.) Ltd., Rosh Haayin (IL)

(72) Inventor: Shaul Haim Yaakoby, Rishon le Zion (IL)

(73) Assignee: Aquarius Engines (A.M.) Ltd., Rosh Haayin (IL)

( * ) Notice: Subject to any disclaimer, the term of this patent is extended or adjusted under 35 U.S.C. 154(b) by 0 days. days.

(21) Appl. No.: 15/210,622

(22) Filed: Jul. 14, 2016

(65) Prior Publication Data
US 2017/0016360 A1 Jan. 19, 2017

Related U.S. Application Data

(60) Provisional application No. 62/192,575, filed on Jul. 15, 2015.

(51) Int. Cl.
*F02B 75/30* (2006.01)
*F01B 11/00* (2006.01)
(Continued)

(52) U.S. Cl.
CPC .............. *F01B 11/001* (2013.01); *F01L 7/02* (2013.01); *F01N 13/10* (2013.01); *F02B 71/00* (2013.01);
(Continued)

(58) Field of Classification Search
CPC .... F02B 75/30; F02B 1/04; F02B 3/06; F01B 7/20; F01N 3/26
(Continued)

(56) References Cited

U.S. PATENT DOCUMENTS 1,040,472 A 10/1912 Wade
1,755,673 A 4/1930 Solenberger
(Continued)

FOREIGN PATENT DOCUMENTS

DE 3518982 A1 11/1986
DE 102008004879 A1 7/2009
(Continued)

OTHER PUBLICATIONS

Jan Ridders, "Dual 2stroke model engine," available at URL: https://www.youtube.com/watch?v=qLwHEUJ752s, uploaded May 22, 2013.
(Continued)

*Primary Examiner* — Jacob Amick
*Assistant Examiner* — Charles Brauch
(74) *Attorney, Agent, or Firm* — Finnegan, Henderson, Farabow, Garrett & Dunner LLP

(57) ABSTRACT

A linear reciprocating engine may include an engine block, a cylinder having combustion chambers at opposing ends, cylinder heads located at an end of the respective combustion chambers, respectively, and a double-faced piston. The engine may further include piston rod portions extending from both faces of the piston through the combustion chambers. The engine may further include an exhaust outlet in a peripheral cylinder wall and elongated channels in the piston rod portions being configured to serve as an intake inlet for gas from a location external to the cylinder. When the piston is in a combustion stage in a first combustion chamber, the piston blocks the exhaust outlet from communicating with the first chamber with the first channel access opening outside the first chamber, while simultaneously the exhaust outlet is in communication with a second combustion chamber with the second channel access opening within the second chamber.

8 Claims, 17 Drawing Sheets

(51) Int. Cl.

| | | |
|---|---|---|
| F02B 71/00 | (2006.01) | |
| F02B 75/00 | (2006.01) | |
| F16J 1/12 | (2006.01) | |
| F16J 9/12 | (2006.01) | |
| F16J 1/00 | (2006.01) | |
| F01N 13/10 | (2010.01) | |
| F02F 1/00 | (2006.01) | |
| F02F 1/06 | (2006.01) | |
| F02F 1/24 | (2006.01) | |
| F02F 3/00 | (2006.01) | |
| F02M 35/10 | (2006.01) | |
| F02M 61/14 | (2006.01) | |
| F16J 7/00 | (2006.01) | |
| F02F 1/22 | (2006.01) | |
| F01L 7/02 | (2006.01) | |
| F02F 3/28 | (2006.01) | |
| F16J 9/06 | (2006.01) | |
| F16J 9/20 | (2006.01) | |
| F02B 71/04 | (2006.01) | |
| F02B 3/06 | (2006.01) | |
| F01N 3/26 | (2006.01) | |
| F02B 1/04 | (2006.01) | |
| F01B 7/20 | (2006.01) | |

(52) U.S. Cl.
CPC ............ *F02B 71/04* (2013.01); *F02B 75/002* (2013.01); *F02F 1/00* (2013.01); *F02F 1/06* (2013.01); *F02F 1/22* (2013.01); *F02F 1/24* (2013.01); *F02F 3/0015* (2013.01); *F02F 3/28* (2013.01); *F02M 35/1015* (2013.01); *F02M 61/14* (2013.01); *F16J 1/005* (2013.01); *F16J 1/008* (2013.01); *F16J 1/12* (2013.01); *F16J 7/00* (2013.01); *F16J 9/06* (2013.01); *F16J 9/12* (2013.01); *F16J 9/20* (2013.01); *F01B 7/20* (2013.01); *F01N 3/26* (2013.01); *F02B 1/04* (2013.01); *F02B 3/06* (2013.01); *F02B 75/30* (2013.01)

(58) Field of Classification Search
USPC ........................................................ 123/60.1
See application file for complete search history.

(56) References Cited

U.S. PATENT DOCUMENTS

| | | | |
|---|---|---|---|
| 1,796,882 | A | 3/1931 | Bowers |
| 2,187,979 | A | 1/1940 | Malpas |
| 2,392,052 | A | 1/1946 | Matheisel |
| 2,399,683 | A | 5/1946 | Loeb |
| 2,407,790 | A | 9/1946 | Le Tourneau |
| 2,831,738 | A | 4/1958 | Marien |
| 2,874,012 | A | 2/1959 | Stern |
| 3,146,940 | A | 9/1964 | McCrory et al. |
| 3,358,656 | A | 12/1967 | Panhard |
| 3,365,879 | A | 1/1968 | Panhard |
| 3,369,733 | A | 2/1968 | Campbell |
| 3,465,161 | A | 9/1969 | Cutkosky |
| 3,797,466 | A | 3/1974 | Nambu |
| 3,914,574 | A | 10/1975 | Hill et al. |
| 4,385,597 | A | 5/1983 | Stelzer |
| 4,414,927 | A | 11/1983 | Simon |
| 4,803,960 | A | 2/1989 | Köppen |
| 4,831,972 | A | 5/1989 | Barnwell |
| 5,285,752 | A | 2/1994 | Reed |
| 5,351,659 | A | 10/1994 | Chao |
| 5,676,097 | A | 10/1997 | Montresor |
| 5,816,202 | A * | 10/1998 | Montresor .............. F02B 33/14 123/61 R |
| 6,065,438 | A | 5/2000 | Kiesel |
| 6,199,519 | B1 | 3/2001 | Van Blarigan |
| 6,240,828 | B1 | 6/2001 | Fujimoto |
| 6,467,397 | B1 | 10/2002 | Fuchs et al. |
| 6,722,322 | B2 | 4/2004 | Tse |
| 6,948,459 | B1 | 9/2005 | Laumen et al. |
| 7,032,548 | B2 | 4/2006 | Tusinean |
| 7,194,989 | B2 | 3/2007 | Hallenbeck |
| 7,207,299 | B2 | 4/2007 | Hofbauer |
| 7,412,949 | B1 | 8/2008 | Cillessen et al. |
| 9,010,287 | B2 | 4/2015 | Morreim |
| 9,206,900 | B2 | 12/2015 | Smith et al. |
| 2005/0284426 | A1 | 12/2005 | Tusinean |
| 2006/0157003 | A1 | 7/2006 | Lemke et al. |
| 2011/0239642 | A1 | 10/2011 | Schwiesow et al. |
| 2012/0266842 | A1 | 10/2012 | Cockerill |
| 2012/0280513 | A1 | 11/2012 | Cockerill |
| 2013/0098874 | A1 | 4/2013 | Liljestrand et al. |
| 2013/0276740 | A1 | 10/2013 | Wandrie et al. |
| 2013/0297784 | A1 | 11/2013 | Sun et al. |
| 2013/0298874 | A1 | 11/2013 | Sun et al. |
| 2014/0116389 | A1* | 5/2014 | Khurgin .............. F02B 75/002 123/46 A |
| 2015/0114352 | A1 | 4/2015 | McAlister et al. |

FOREIGN PATENT DOCUMENTS

| | | | | |
|---|---|---|---|---|
| GB | 602310 | A * | 5/1948 | ............ F02B 75/30 |
| GB | 2183726 | A | 6/1987 | |
| GB | 2353562 | A | 2/2001 | |
| JP | 63-192916 | | 10/1988 | |

OTHER PUBLICATIONS

Office Action dated Oct. 11, 2016 for U.S. Appl. No. 15/210,589.
Office Action dated Sep. 16, 2016 for U.S. Appl. No. 15/210,596.
Office Action dated Sep. 23, 2016 for U.S. Appl. No. 15/210,609.
Office Action dated Sep. 29, 2016 for U.S. Appl. No. 15/210,613.
Office Action dated Sep. 19, 2016 for U.S. Appl. No. 15/210,629.
Office Action dated Sep. 21, 2016 for U.S. Appl. No. 15/210,633.
Office Action dated Jan. 23, 2017 for U.S. Appl. No. 15/210,629.
Office Action dated Feb. 17, 2017 for U.S. Appl. No. 15/210,613.
Office Action dated Jul. 10, 2017 for U.S. Appl. No. 15/210,609.
Office Action dated Feb. 2, 2017 for U.S. Appl. No. 15/210,596.
Office Action dated Nov. 22, 2017 for U.S. Appl. No. 15/306,238.
Office Action dated Mar. 14, 2017 for U.S. Appl. No. 15/210,633.
Office Action dated Aug. 2, 2017 for U.S. Appl. No. 15/210,633.
Office Action dated Nov. 22, 2017 for U.S. Appl. No. 15/210,629.
Office Action dated May 3, 2017 for U.S. Appl. No. 15/210,629.

\* cited by examiner

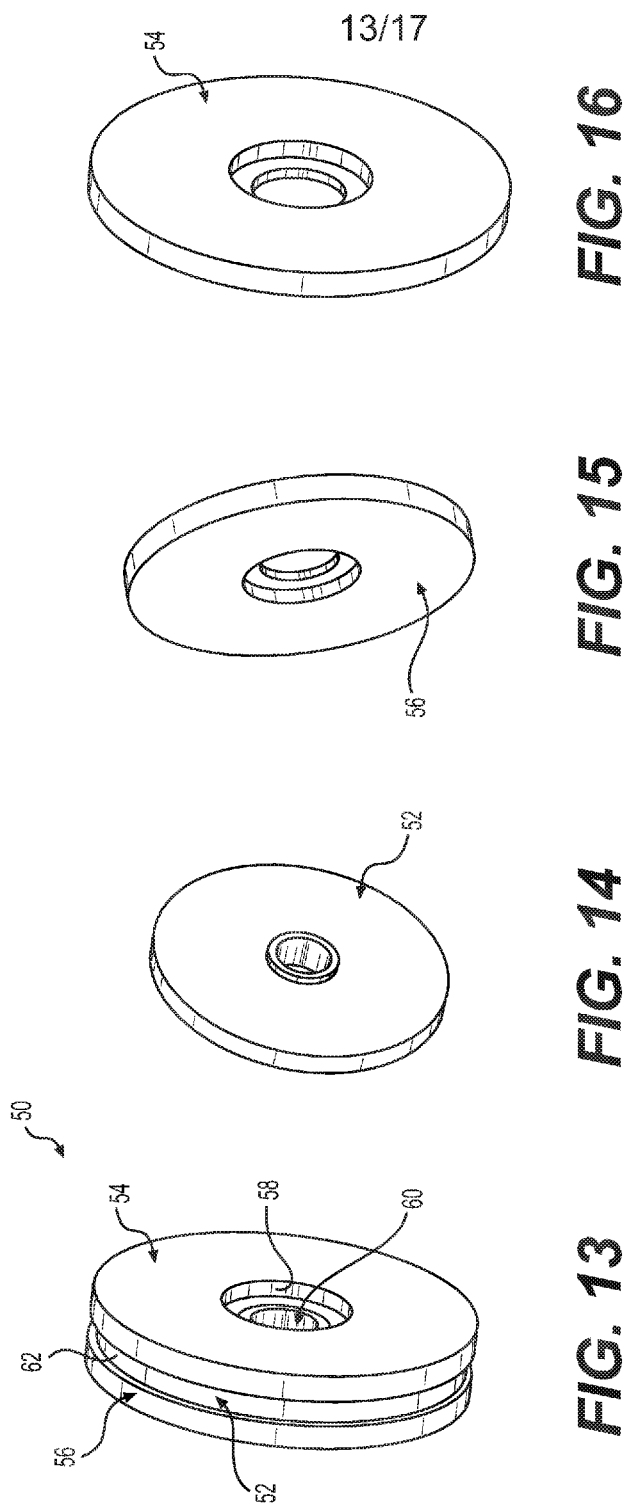

TIMED GAS EXCHANGE IN ENGINE USING PISTON AS EXHAUST VALVE

RELATED APPLICATIONS

This application claims priority to U.S. Provisional Application No. 62/192,575, titled "Free Piston Engine" and filed on Jul. 15, 2015, which is incorporated herein by reference in its entirety

TECHNICAL FIELD

The present disclosure relates to the field of internal combustion engines, and more particularly to the field of internal combustion engines having a free piston.

BACKGROUND

Internal combustion engines are known. The most common types of piston engines are two-stroke engines and four-stroke engines. These types of engines include a relatively large number of parts, and require numerous auxiliary systems, e.g., lubricant systems, cooling systems, intake and exhaust valve control systems, and the like, for proper functioning.

SUMMARY

Some embodiments of this disclosure may include a linear reciprocating internal combustion engine. The engine may include an engine block, a cylinder within the engine block, having a first combustion chamber at a first end thereof and a second combustion chamber at an opposing second end thereof, and a double-faced piston slidably mounted within the cylinder. The engine may also include a first piston rod portion extending from a first face of the double-faced piston through the first combustion chamber and a second piston rod portion extending from a second face of the piston through a second end of the second combustion chamber. The engine may further include at least one exhaust outlet located in a peripheral wall of the cylinder in a region generally central between the first combustion chamber and the second combustion chamber. A first elongated channel in the first piston rod portion may be configured to serve as an intake inlet for gas from a location external to the cylinder, through the first end of the first combustion chamber to a location within the first combustion chamber. A second elongated channel in the second piston rod portion also may be configured to serve as an intake inlet for gas from a location external to the cylinder, through the second end of the second combustion chamber to a location within the second combustion chamber. In each of the first and second piston rod portions, a length of the double-faced piston, a length of the cylinder, a location of the exhaust outlet, and a location of a channel access opening may be arranged such that when the piston is in a combustion stage in the first combustion chamber, the piston blocks the exhaust outlet from communicating with the first combustion chamber with the channel access opening in the first piston rod portion being outside of the first combustion chamber, while simultaneously the exhaust outlet is in fluid communication with the second combustion chamber with the access opening of the second channel is within the second combustion chamber.

In some embodiments, a spacing between a channel access opening in the first piston rod portion and the first face of the piston and the location of the exhaust outlet may be configured such that scavenging of combustion gases from the first combustion chamber occurs through the exhaust outlet when a channel access opening in the first piston rod portion is located within the first combustion chamber and the piston is in a position on the second combustion chamber side of the exhaust outlet.

Alternatively, a spacing between a channel access opening in the first piston rod portion and the first face of the piston and the location of the exhaust outlet may be configured such that gas boost in the first combustion chamber follows scavenging of combustion gases from the first combustion chamber as pre-charged air continues to be introduced through the channel access opening in the first piston rod portion into the first combustion chamber.

Alternatively, a spacing between a channel access opening in the first piston rod portion and the first face of the piston and the location of the exhaust outlet may be configured such that compression of gases within the first combustion chamber occurs when the piston is in a position past the exhaust toward the first end of the first combustion chamber and the access opening in the first piston rod portion is outside of the first combustion chamber.

In other aspects, a spacing between a channel access opening in the second piston rod portion and the second face of the piston and the location of the exhaust outlet also may be configured such that compression of gases within the second combustion chamber occurs when the piston is in a position past the exhaust outlet toward the second end of the second combustion chamber and the channel access opening in the second piston rod portion is outside of the second combustion chamber.

Alternatively, a spacing between a channel access opening in the second piston rod portion and the second face of the piston and the location of the exhaust outlet may be configured such that scavenging of combustion gases from the second combustion chamber occurs through the exhaust outlet when the channel access opening in the second piston rod portion is in the second combustion chamber and the piston is in a position past the exhaust outlet toward the first end of the first combustion chamber.

Alternatively, a spacing between a channel access opening in the second piston rod portion and the second face of the piston and the location of the exhaust outlet may be configured such that gas boost in the second combustion chamber follows scavenging of combustion gases from the second combustion chamber as pre-charged air continues to be introduced through the channel access opening in the second piston rod portion into the second combustion chamber.

In other aspects of this disclosure, a compression ratio of the engine may be a function of at least one of a closest spacing between a channel access opening in the first piston rod portion and the first face of the double-faced piston, and the closest spacing between a channel access opening in the second piston rod portion and the second face of the double-face piston.

The forgoing generally describes just a few exemplary aspects of the disclosure. It is to be understood that both the foregoing general description and the following detailed description are exemplary and explanatory only, and are not restrictive of the invention, as claimed.

BRIEF DESCRIPTION OF THE DRAWINGS

FIG. 13 is a perspective view of a piston assembly that may be used with the engine of FIGS. 1 and 2;

FIG. 14 is a perspective view of a piston center disk of the piston assembly of FIG. 13;

FIG. 15 is a perspective view of a left-side piston disk of the piston assembly of FIG. 13;

FIG. 16 is a perspective view of a right-side piston disk of the piston assembly of FIG. 13;

DETAILED DESCRIPTION

The present disclosure relates to internal combustion engines. While the present disclosure provides examples of free piston engines, it should be noted that aspects of the disclosure in their broadest sense, are not limited to a free piston engine. Rather, it is contemplated that the forgoing principles may be applied to other internal combustion engines as well.

An internal combustion engine in accordance with the present disclosure may include an engine block. The term "engine block," also used synonymously with the term "cylinder block," may include an integrated structure that includes at least one cylinder housing a piston. In the case of a free piston engine block, the engine block may include a single cylinder, or it may include multiple cylinders.

In accordance with the present disclosure, a cylinder may define at least one combustion chamber in the engine block. In some internal combustion engines in accordance with the present disclosure, a combustion chamber may be located on a single side of a cylinder within an engine block. In other internal combustion engines in accordance with the present disclosure, the internal combustion engine may include two combustion chambers, one on each side of a cylinder within an engine block.

Embodiments of the present disclosure may further include a piston in the cylinder. In accordance with some embodiments of the invention used in a free piston engine, the piston may include two heads on opposite sides thereof. In some embodiments of the invention, the piston may be considered to be "slideably mounted" in the cylinder. This refers to the fact that the piston slides through the cylinder from one side of the cylinder to the other. While the present disclosure describes piston examples, the invention in its broadest sense is not limited to a particular piston configuration or construction.

Figure 1:
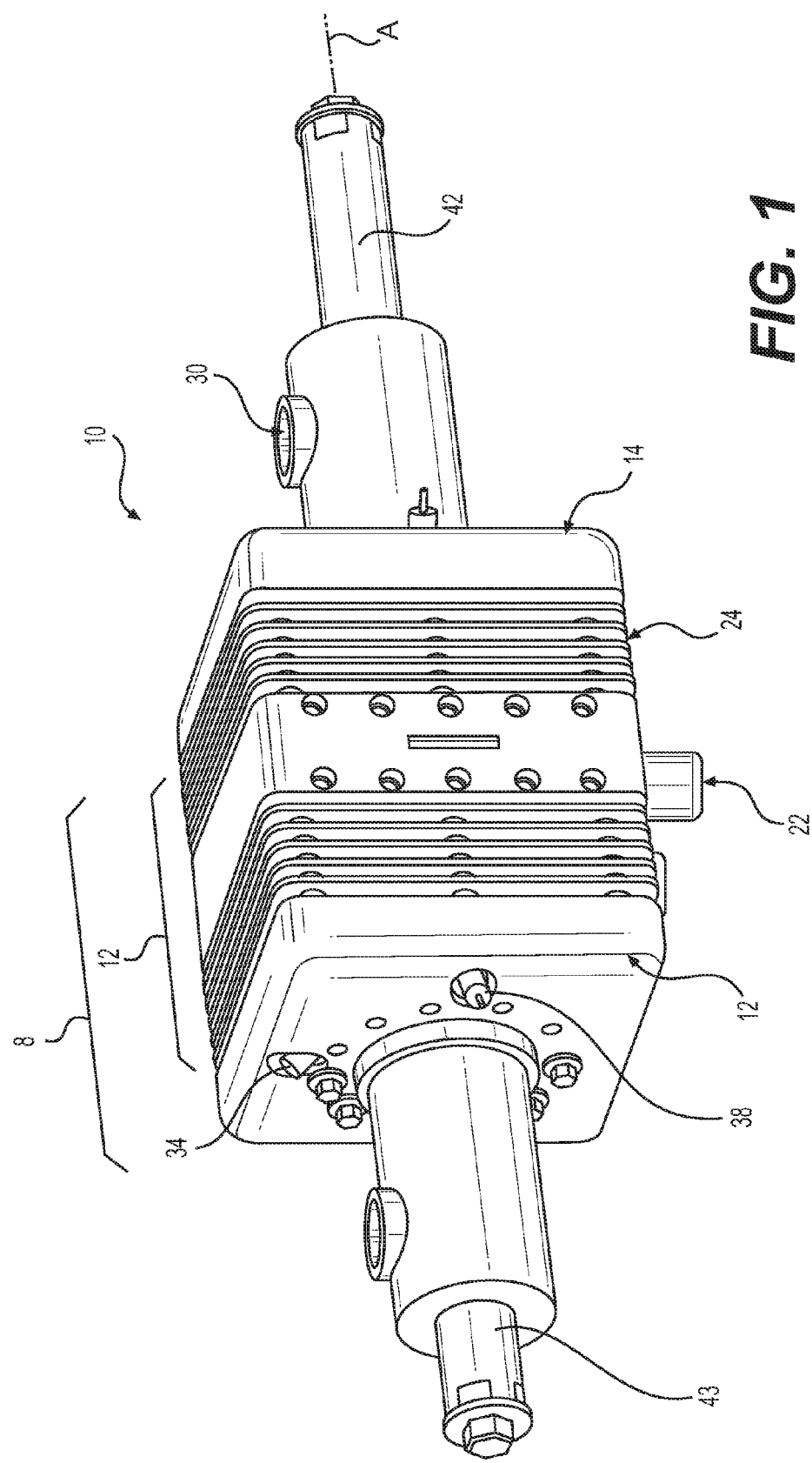
FIG. 1 is a perspective view of a free piston engine according to the present disclosure.
Figure 2:
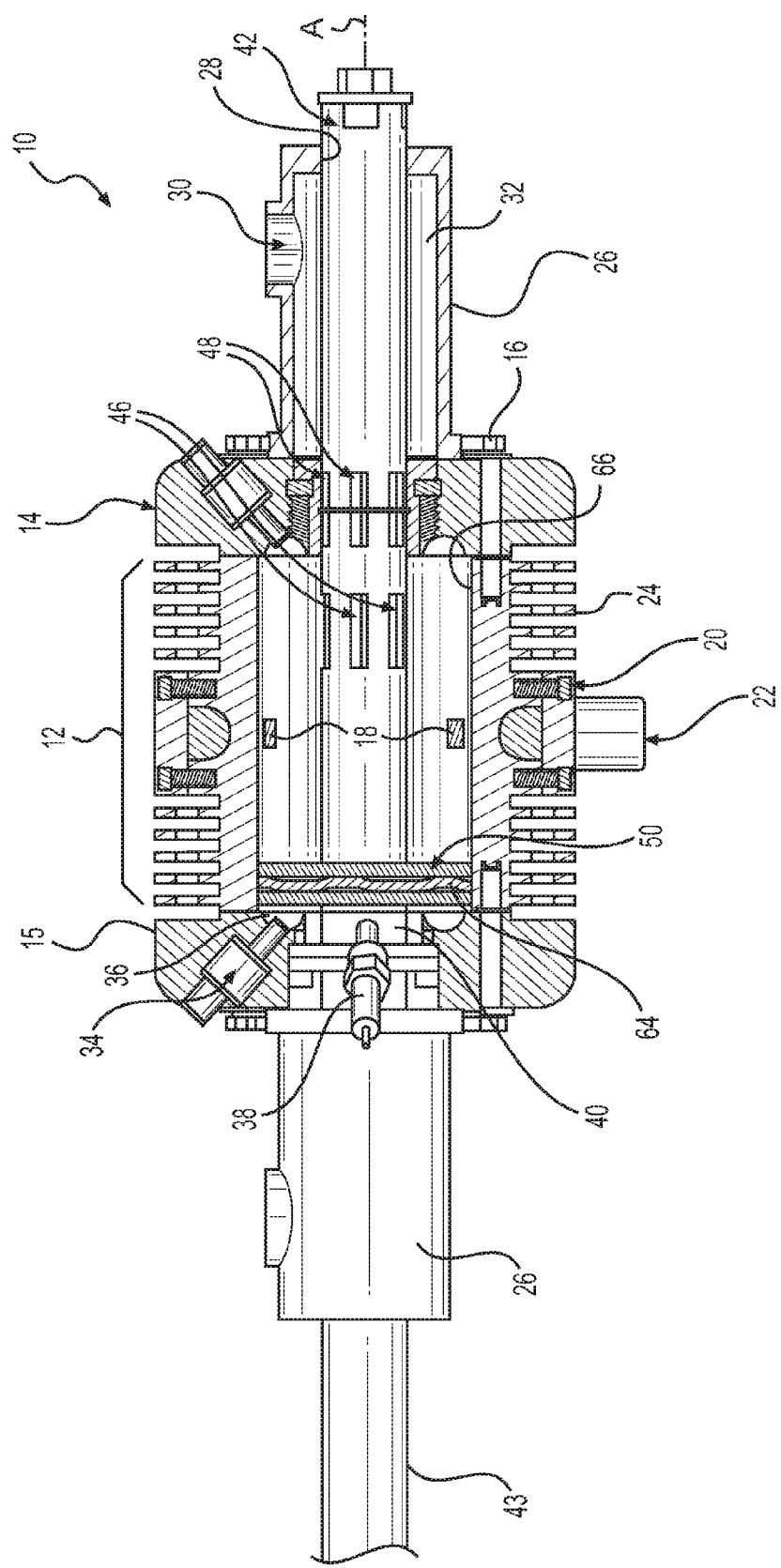
FIG. 2 is a partial cross-sectional view of the engine of FIG. 1 with the piston at top dead center on a left side of the cylinder.

FIGS. 1 and 2 illustrate an exemplary embodiment of a free piston engine 10 according to the present disclosure. The free piston engine 10, which is sometimes referred to herein simply as an engine, is one example of an internal combustion engine including an engine block 8. A cylinder 12 defining at least one combustion chamber may be included in the engine block and may have a central, longitudinal axis A, and a double-faced piston 50 reciprocally mounted in the cylinder 12. The double-faced piston 50 may be configured to travel in a first stroke from a first end of the cylinder to an opposite second end of the cylinder, and in a second stroke from the second end of the cylinder back to the first end of the cylinder. FIGS. 7-12 illustrate an exemplary movement of the piston 50 from a first end of the cylinder to a second end of the cylinder. At least one piston rod portion may be connected to the piston rod and may extend from a location within the at least one combustion chamber to an area external to the cylinder. As used herein, the term piston rod portion includes any portion of a rod or shaft, extending from a piston. In some embodiments, a piston rod portion may be a portion of a unified structure passing all the way through the piston. In other embodiments, a piston rod portion may be a portion of a piston rod that extends from only one face of a piston.

Figure 3:
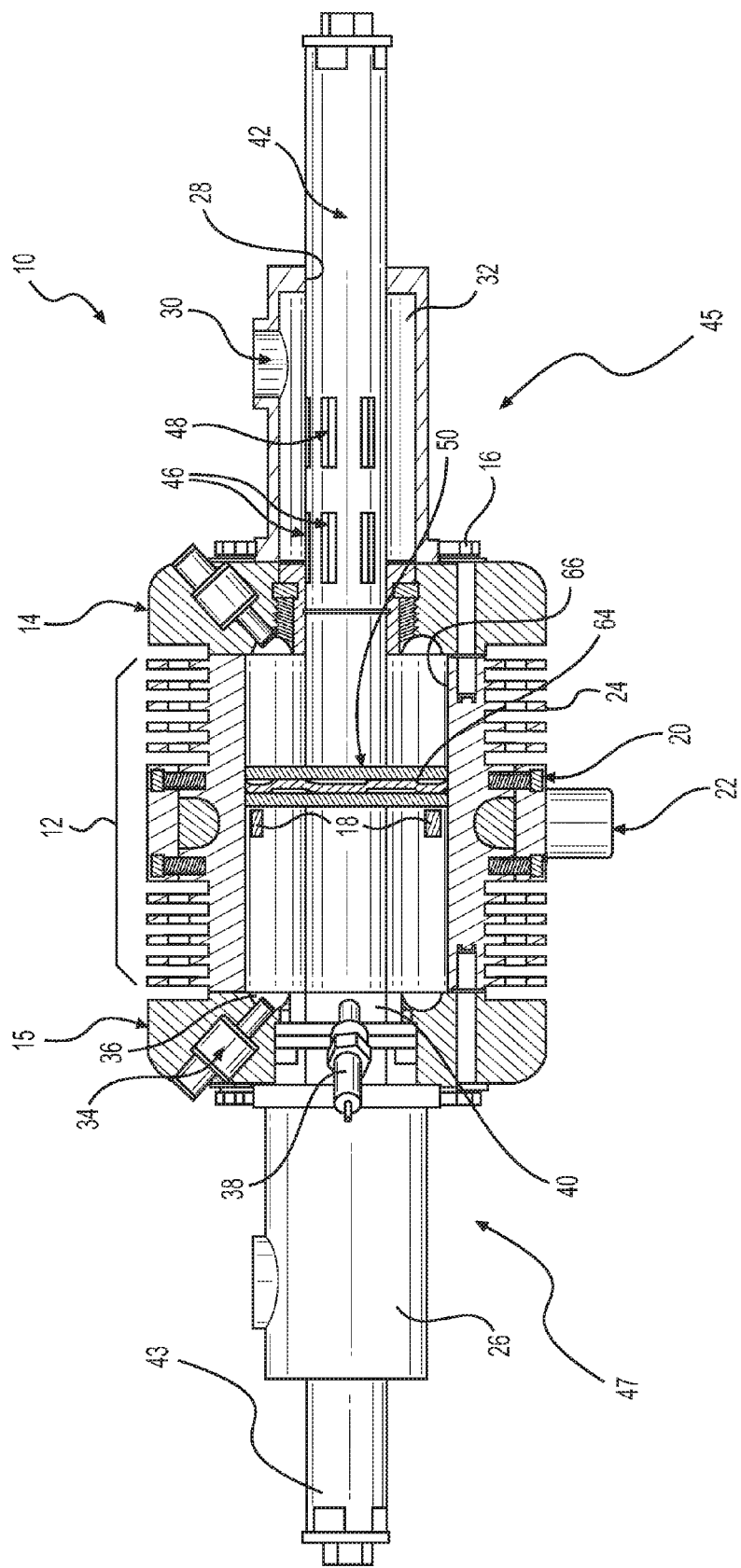
FIG. 3 is a partial cross-sectional view of the engine of FIG. 1 with the piston in a momentum portion of the stroke, in an early stage of compressing gasses on the right side of the engine.

By way of example, in FIG. 3, a piston rod portion 42 may be connected one face of the piston 50 and extend from a location within the at least one combustion chamber to an area 45 external to the cylinder. Similarly, a second piston rod portion 43 may extend from an opposite face of double sided piston 50, to another area 47 external to the cylinder 12. Piston rod portions 42 and 43 may be integral with each other, or may be completely separate structures, each extending from an opposite side of piston 50.

An area external (e.g. areas 45 and 47) to the cylinder may include an inlet manifold at each end of the cylinder configured for supplying combustion gases to each of the combustion chambers at the opposite ends of the cylinder from one or more sources of the gases external to the cylinder, or an exhaust manifold configured for receiving combustion gases from the combustion chambers and directing the combustion gases away from the cylinder for exhaust aftertreatment. In this way, for example, a passageway of the piston rod portion is configured to introduce combustion gas into a combustion chamber from a location outside the cylinder. In one embodiment, the areas 45 and 47 external to the cylinder may simply refer to any region on an opposite side of a cylinder head 14, 15 from the cylinder 12, regardless of whether the region is in direct contact with a cylinder head. It is contemplated that ports could be provide to introduce gases from a manifold or other source located alongside the cylinder, rather than at ends of the cylinder. Thus, in a general sense, locations outside the cylinder may be at either the ends of the cylinder, alongside the cylinder, or a combination of both.

In accordance with embodiments of the invention, each piston rod portion may include at least one recess forming a passageway configured to communicate gas flow between the at least one combustion chamber and the area external to the cylinder. As used herein, the term "recess" can be defined by any structure or void capable of communicating gas flow. It may include, for example, a channel or conduit completely or partially contained within at least part of the piston rod portion. Or, the recess may include one or more exposed grooves or other cut-outs in at least part of the piston rod portion.

For example, in some exemplary embodiments of an engine according to this disclosure, the one or more recesses forming passageways in the piston rod portions may render the piston rod portions 42 and 43 at least partially hollow. In some variations, a passageway may include a groove or grooves formed along an external periphery of the piston rod portion. Still further variations may include different outer diameter sections of the piston rod portions. Such area(s) of reduced diameter may provide one or more gaps through which gas may flow. Alternatively, the one or more recesses forming the passageways may include a channel extending internal to a piston rod portion. In yet a further alternative, the recess may render the piston rod portion hollow in some areas and partially hollow (e.g., via external groove, slot, etc.) in other areas. At least one port may be formed in each piston rod, in fluid communication with the passageway of the piston rod portion, to thereby permit gas to enter and/or exit the passageway through the port.

Figure 22:
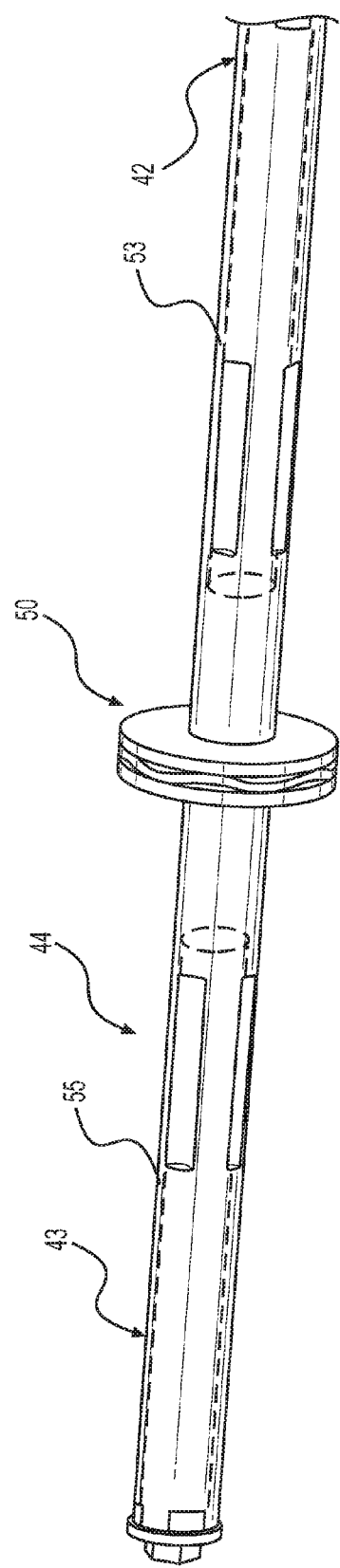
FIG. 22 is another perspective view of the piston assembly and piston ring of FIG. 20 assembled on the piston rods of FIG. 2 with different inlet passageways.
Figure 23:
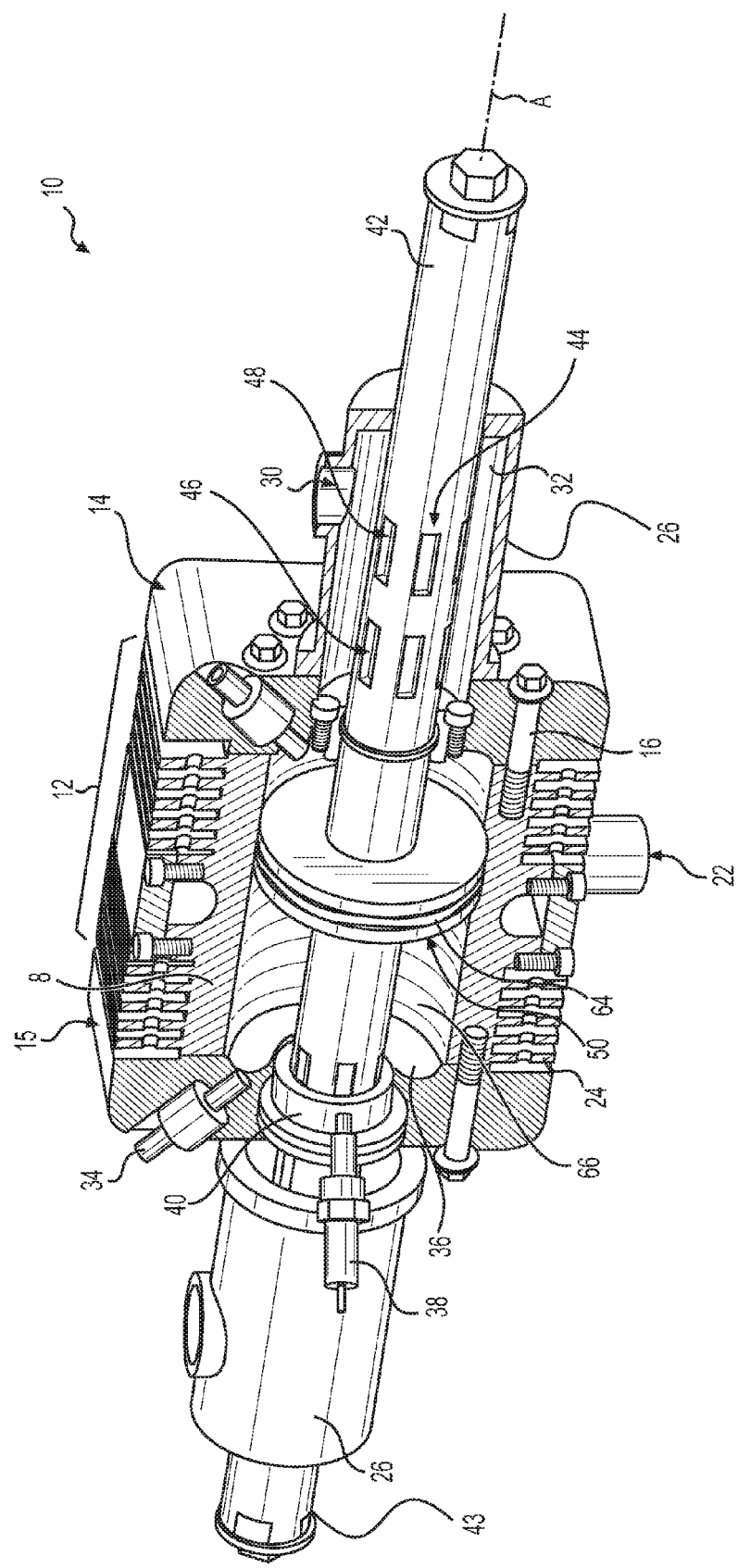
FIG. 23 is a perspective partial cross-sectional view of the engine of FIG. 1.

By way of example with reference to FIG. 22, each piston rod portion 42 and 43 may include a recess 53, 55, respectively (e.g., hollowed out internal portion of piston rod portions 42 and 43), forming a passageway or channel configured to communicate gas flow between the combustion chambers 49 and 51 (see FIGS. 5 and 10, respectively) and respective areas 45 and 47 external to the cylinder 12. The hollowed out region may, for example, be a bore through a core of a piston rod portion.

Figure 5:
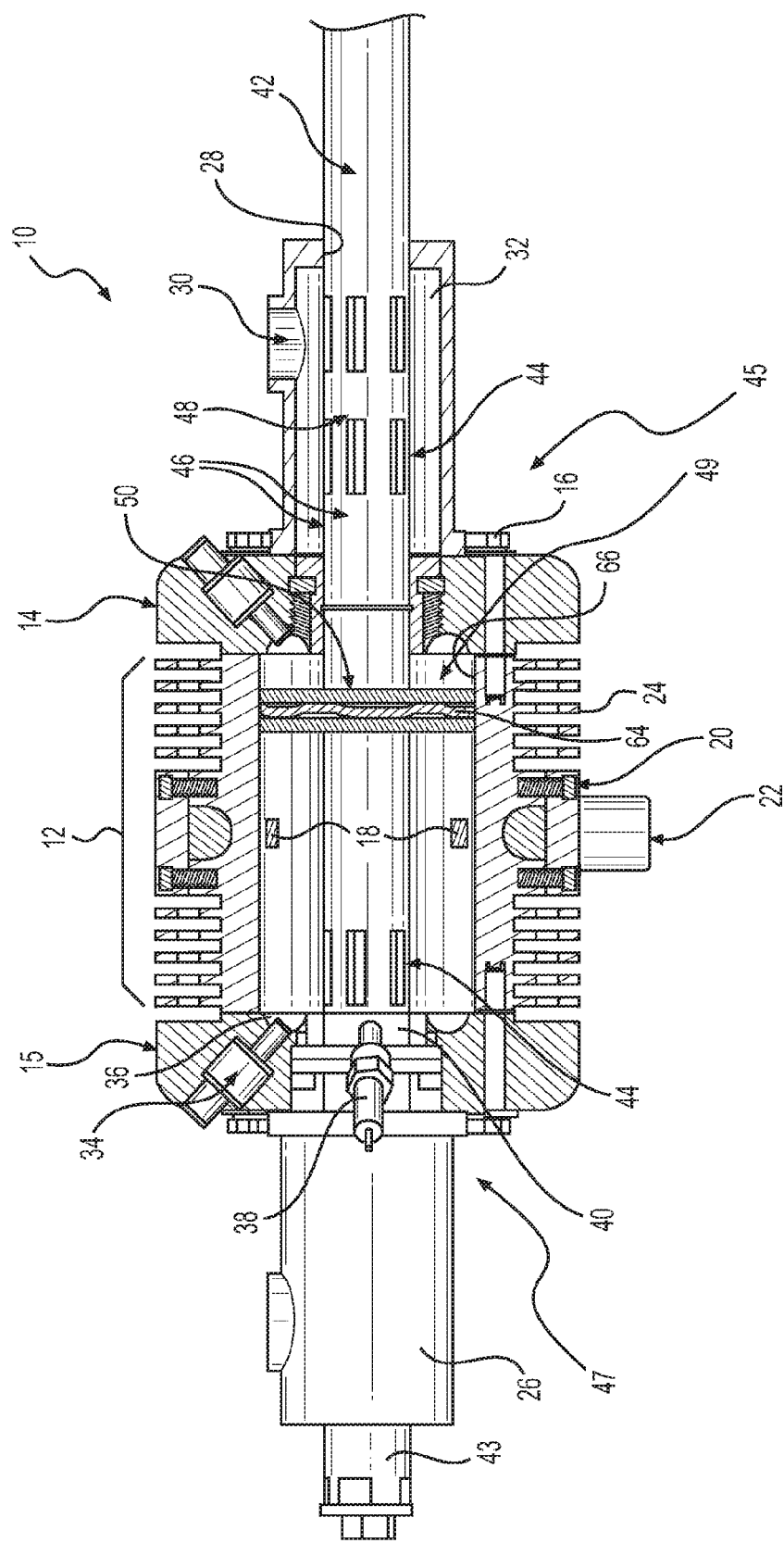
FIG. 5 is a partial cross-sectional view of the engine of FIG. 1 in an advanced stage of compression on the right side of the cylinder beyond the compression illustrated in FIG. 4.
Figure 10:
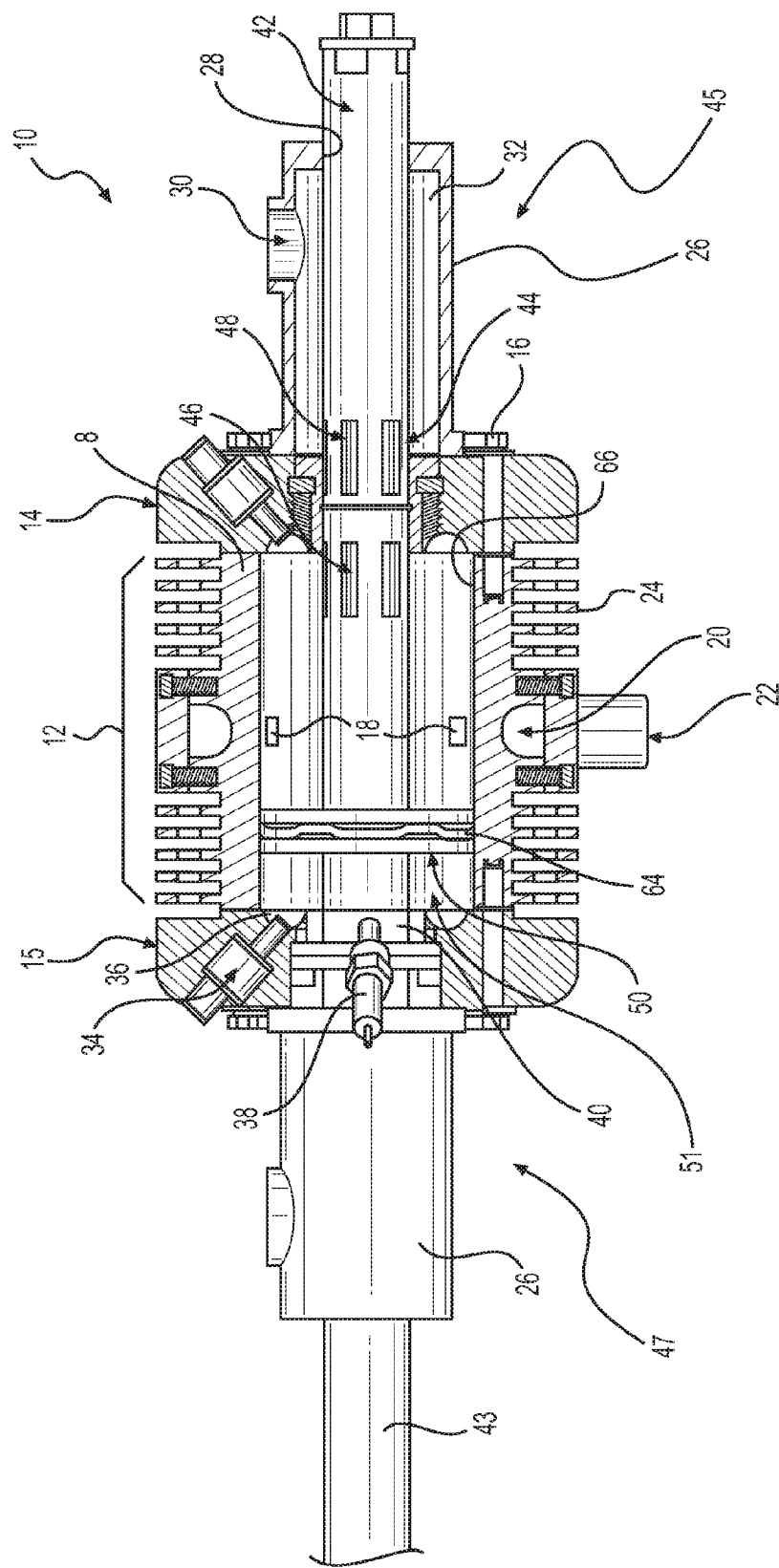
FIG. 10 is a partial cross-sectional view of the engine of FIG. 1 in an advanced stage of compression on the left side of the cylinder beyond the compression illustrated in FIG. 9.

As illustrated in FIG. 5, a first combustion chamber may be defined in region 49, between a face of piston 50 and a first head 14 of cylinder 12. Likewise, as illustrated in FIG. 10, a second combustion chamber 51 may be defined between an opposing face of piston 50 and an opposing head 15 of cylinder 12. Of course, it is to be understood that each combustion chamber is a variable region that essentially includes a swept volume on each side of the piston, and which is compressed as the piston moves from one end of the cylinder to the opposite end of the cylinder.

The passageways or recesses 53 and 55, as illustrated in FIG. 22, are exemplary only. For example, as illustrated, the recesses extend just past ports 44, terminating before reaching piston 50. Numerous other configurations are contemplated within this disclosure. For example, recesses 53 and 55 could extend further toward the piston, all the way to the piston, or may cross one face of the piston. In a preferred embodiment, passageways 53 and 55 are not in flow-communication with each other.

In one exemplary embodiment shown in the figures, one or more ports 44, which may be arranged in two groups, i.e., an inner group 46, that is closest to the piston 50, and an outer group 48, that is distal to the inner group 46. Ports 44 may be configured to serve as inlets for conveying gas into the cylinder via recesses 53 and 55. In lieu of two groups of inlet ports, only one group of inlet ports 44 may be employed, or more than two groups of inlet ports 44 spaced along the piston rod portions 42 may be employed. Moreover, the inlet ports do not necessarily need to be arranged in groups, so long as there is sufficient opening to convey gases from the channels within the piston rods, defined by recesses 53 and 55.

In accordance with some embodiments of the invention, a first passageway and the second passageway in the piston rod portions may be configured to prevent gases from being exchanged between the cylinder and a location outside the cylinder via a path that crosses the first face and the second face of the piston. For example, the pair of piston rod portions 42 and 43 extending from opposite faces of the double-faced piston 50 may be integrally formed, or may be indirectly connected to each other through the double-faced piston. However, no interconnecting flow passageway may be provided between the piston rods. In such a construction, no communication of gas flow may occur between the cylinder and a location outside the cylinder that crosses both the first and second faces of the double-faced piston 50. Thus, the recesses and/or passageways in each piston rod portion may be separate from each other and may extend through different piston rod portions.

If the cylinder head on each side of the engine block includes (e.g., is connected to or is integrally formed with) an intake manifold, the passageway in the first piston rod portion may be configured to communicate gas flow between the first combustion chamber and the intake manifold at the first end of the cylinder, and the passageway in the second piston rod portion may be configured to communicate gas flow between the second combustion chamber and the intake manifold at the second end of the cylinder. Thus, for example, with reference to FIG. 10, gases from combustion gas inlet chamber 32 of intake manifold 26 may enter the combustion chamber as ports 46 and 48 bridge the cylinder head 14.

A cylinder in accordance with embodiments of the invention may be closed at both ends. For example, the cylinder 12 of engine 10 may be closed at both ends thereof by a cylinder heads 14 and 15, which may be connected to the cylinder 12 by a plurality of bolts 16. As used herein, the term "closed" does not require complete closure. For example, despite that the cylinder heads may have openings therein through which piston rod portions 42 and 43 pass, the cylinder heads are still considered "closed" within the meaning of this disclosure.

A peripheral portion of the cylinder 12 may be provided with cooling fins 24. Alternative configurations of the engine 10 may include other external or internal features that assist with the cooling of the cylinder, such as water passageways formed internally within the cylinder walls or jacketing at least portions of the cylinder walls for water cooling, and other configurations of cooling fins or other conductive and/or convective heat transfer enhancement features positioned along the exterior of a cylinder peripheral wall to facilitate fluid cooling of the cylinder.

Also in accordance with exemplary embodiments of the invention, a peripheral wall of the cylinder between the first and second ends may include at least one exhaust port. By way of example only, the cylinder 12 may include at least one exhaust port 18 in a peripheral side wall of the cylinder 12 between the first and second ends of the cylinder. In the exemplary embodiment illustrated in FIGS. 2-12, a plurality of distributed exhaust ports 18 may be spaced about the circumference of the cylinder at approximately a midpoint of the cylinder 12 between the opposite ends of the cylinder. The exhaust ports 18 may be of any suitable size, shape, and distribution so as to accomplish the function of exhausting gases from the cylinder. One of more of the exhaust ports may, for example, be located in an axial central region of the cylinder peripheral wall, as illustrated in the figures. Although the exemplary embodiment shown in the figures is configured symmetrically, with the exhaust ports 18 located midway between the opposite ends of the cylinder, alternative embodiments may position the exhaust ports at one or more radial planes intersecting the cylinder peripheral wall at locations other than the exact midway point between the cylinder heads 14.

In accordance with some exemplary embodiments of the invention, at least one port may be configured to communicate gas flow between the first combustion chamber and outside the cylinder when the piston is on the second combustion chamber side of the at least one port, and may be configured to communicate gas flow between the second combustion chamber and outside the cylinder when the piston is on the first combustion chamber side of the at least one port. By way of example only, this can occur when, as illustrated in FIG. 5, piston 50 is located to the right of ports 18, enabling conveyance of gas flow through port 18, from the combustion chamber to the left of the piston 50. Ports 18 enable gas flow to a location "outside" the combustion chamber. That outside location may be on the side of the cylinder as illustrated, or conduits (not shown) associated with the engine might deliver the gases to other locations.

The inlet manifold 26 may be connected to or formed integrally with each of the cylinder heads 14,15 at opposite ends of the cylinder 12. The inlet manifold 26 may include a piston rod opening 28 that is axially aligned with the longitudinal axis A, and one or more inlet openings 30, which may be positioned at a distal end of the inlet manifold, as shown, or at any location along the outer periphery of the inlet manifold. The one or more inlet openings 30 in inlet manifold 26 may be configured to direct inlet gases into the inlet manifold transversely to the longitudinal axis A. An inner space of the inlet manifold 26 may define an inlet chamber 32. Although the inlet manifold of the exemplary embodiment shown in FIGS. 1-12 and 23 is illustrated as having a cylindrically-shaped configuration, alternative embodiments may provide one or more inlet manifolds with other shaped profiles or cross sections, or may incorporate the inlet manifolds at least partially within the cylinder heads 14, 15 as one or more internal passageways defined within each of the cylinder heads at each end of the cylinder 12.

Each of the cylinder heads 14, 15 may further include one or more injectors 34 that open into an annular or toroidal-shaped recess 36 formed in or contiguous with a flame face of a fire deck of each cylinder head at each end of the cylinder 12 in facing relationship with the combustion chambers at each end of the cylinder 12. Toroidal-shaped recess 36 may impart swirl flow to fuel gas injected by injectors 34 to facilitate more complete combustion of the gases within the combustion chambers. The cylinder heads 14, 15 may also include one or more cavities for accommodating and mounting one or more spark plugs 38, and bushings 40 for aligning, supporting, guiding, and sealing (by means of a dedicated seal) a piston rod portion 42, 43 that is supported by, and passes through each of the cylinder heads 14, 15 at opposite ends of the cylinder 12. This is one example of how piston rod portions may extend from faces of a double-faced piston through a combustion chamber. Regardless of the particular details of any aperture through which the piston rods may extend at ends of the cylinder, a piston rod that extends to at least an end of the cylinder is said to extend through a combustion chamber within the meaning of this disclosure.

Figure 6:
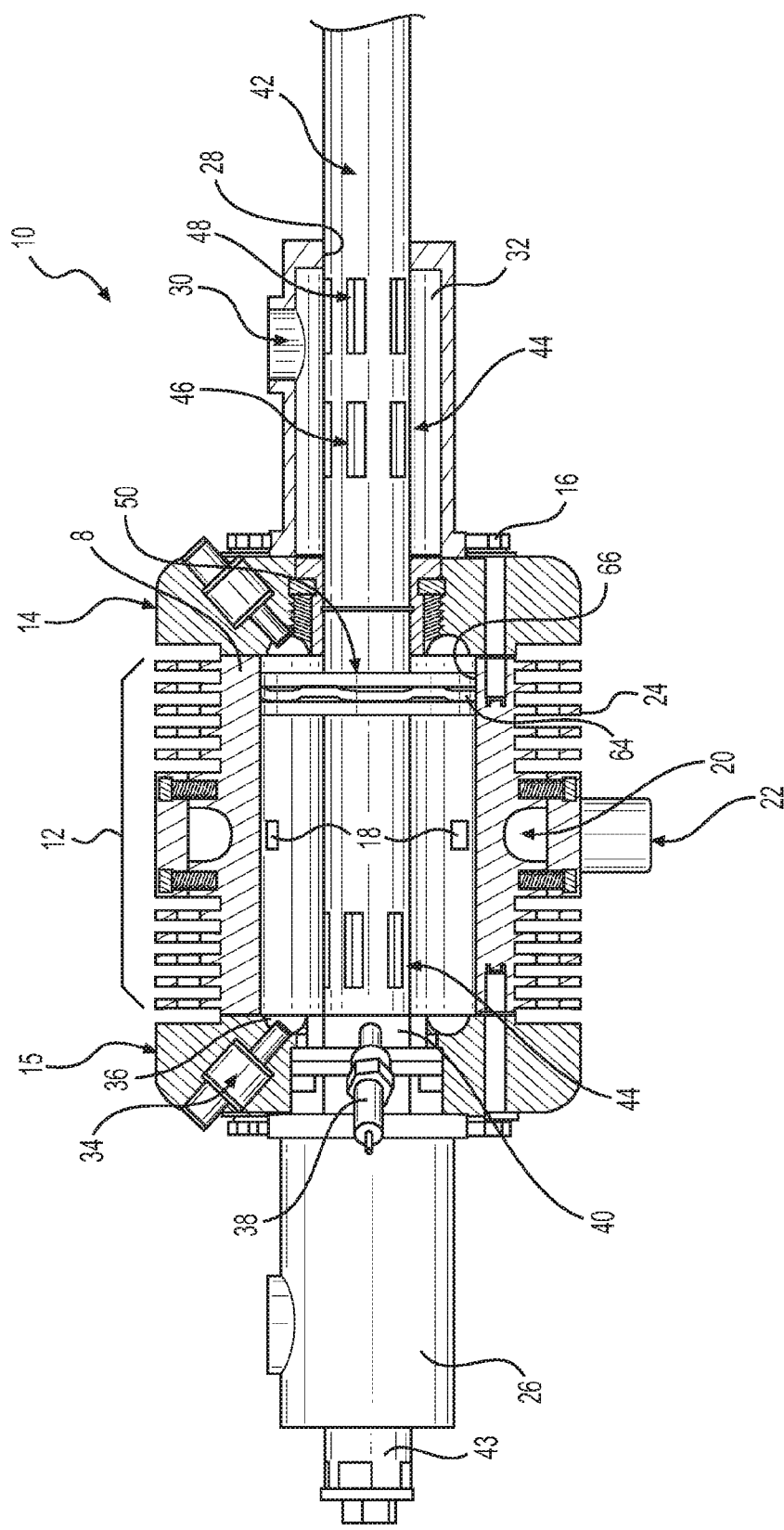
FIG. 6 is a partial cross-sectional view of the engine of FIG. 1 in an even more advanced stage of compression on the right side of the cylinder beyond the compression illustrated in FIG. 5.
Figure 7:
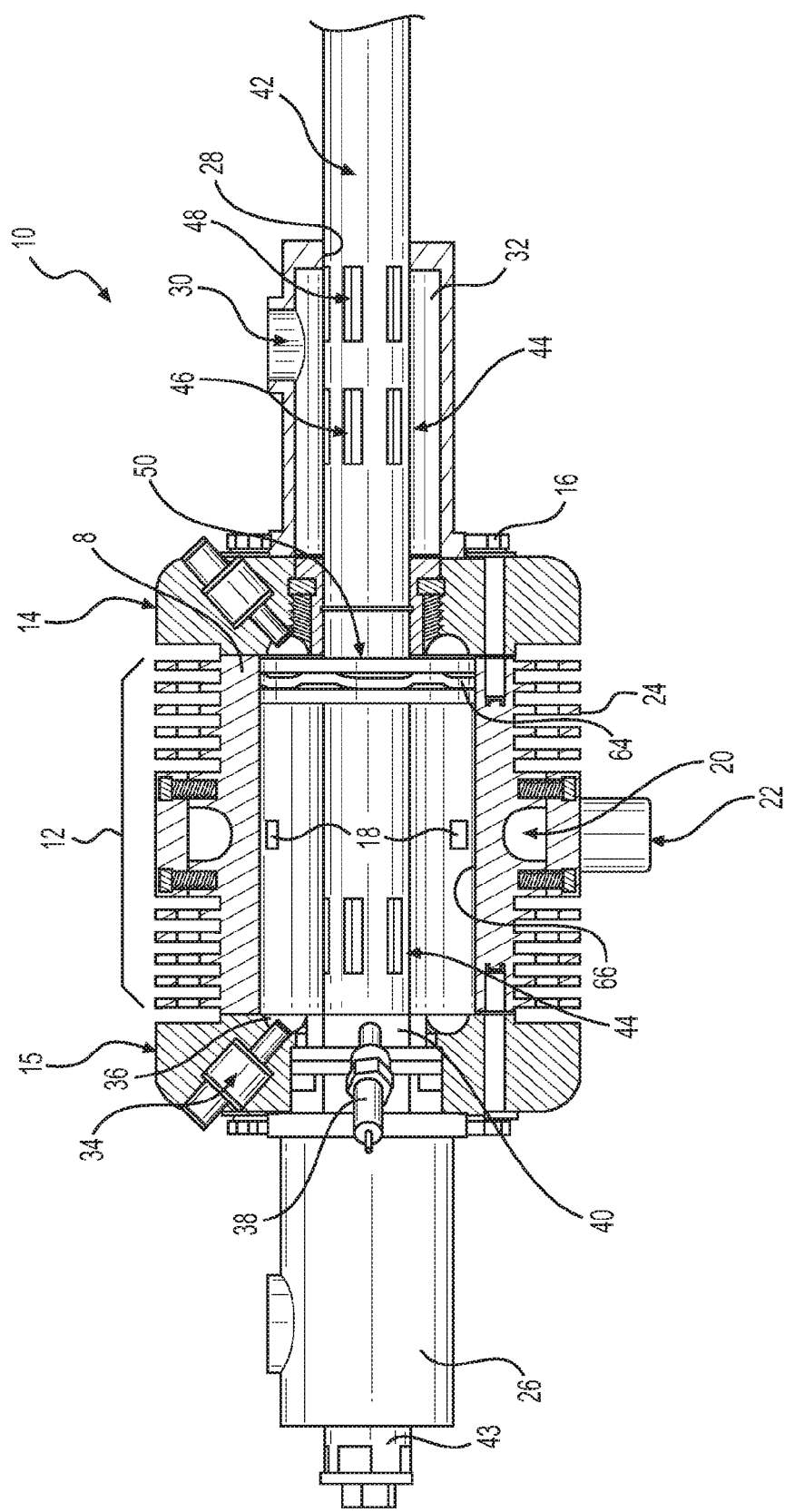
FIG. 7 is a partial cross-sectional view of the engine of FIG. 1 with the piston at top dead center on a right side of the cylinder.

A double-faced piston consistent with embodiments of the invention, may be configured to travel in a first stroke from a first end of the cylinder to an opposite second end of the cylinder, and in a second stroke from the second end of the cylinder back to the first end. This length of travel is illustrated, by way of example, in FIGS. 2-7, where FIG. 2 represents an end of a first stroke, FIG. 7 represents an end of a second stroke, and FIGS. 3-6 represent exemplary intermediate positions.

According to various exemplary embodiments of the present disclosure, the piston may be sized relative to the cylinder to enable an expansion stroke portion of each stroke wherein the piston travels under gas expansion pressure, and a momentum stroke portion of each stroke for the remainder of the stroke following the expansion stroke portion. The expansion stroke portion of each of the first and second strokes of the piston is the portion of travel when the piston directly moves under the expansion pressure of combustion. For example, the expansion portion of a stroke may be defined as the portion from a Top Dead Center (TDC) position of the piston at each end of the cylinder to the point at which combustion gases may be exchanged between the combustion chamber in which ignition of combustion gases has just occurred and an area external to the cylinder.

At the TDC position of the piston during each stroke, a clearance volume remains between each of the opposite faces of the double-faced piston and a respective end of the cylinder as closed off by the cylinder heads 14, 15. The combustion gases that have been introduced into the combustion chamber before the piston reaches TDC are compressed into the remaining clearance volume on that side of the piston between the piston face and the fire deck of the cylinder head. The compressed gases, which usually include a fuel/air mixture, may be ignited by either a spark, or by self-ignition resulting at least in part from the compression of the combustion gases. The expansion stroke portion of each stroke occurs after the ignition of the compressed combustion gases as chemical energy from the combustion in each combustion chamber is converted into mechanical power of the piston. Simultaneously with the expansion stroke portion of each stroke on one side of the piston, gas flow may occur for substantially the entire expansion stroke portion between the combustion chamber on the opposite side of the piston and the intake manifold at the opposite end of the cylinder, as well as the exhaust manifold 20 located at a central peripheral portion of the cylinder.

At the beginning of an expansion stroke portion of a stroke from the left end of the cylinder to the right end, as shown in FIG. 2, gas flow may occur between the combustion chamber on the right side of the piston and the inlet manifold 26 on the right side of the cylinder, and between the combustion chamber on the right side of the piston and the exhaust manifold 20 through the exhaust ports 18. The communication of gases between the combustion chamber on the right side of the piston and the exhaust manifold may continue until the right face of the piston has moved past the centrally located exhaust ports 18, acting as an exhaust valve and shutting off communication between the right combustion chamber and the exhaust manifold. Additionally, before the piston 50 has even closed off the exhaust ports 18, the inlet ports 44 closest to the right face of the piston may have moved outside of the right combustion chamber, thereby closing off communication of gases between the right inlet manifold 26 and the right combustion chamber through the right piston rod portion 42.

According to some embodiments, a length of the double-faced piston, a length of the cylinder, a location of the exhaust outlet, and a location of a channel access opening in each of the first and second piston rod portions may be arranged such that when the piston is in a combustion stage in the first combustion chamber, the piston blocks the exhaust outlet from communicating with the first combustion chamber and the channel access opening in the first piston rod portion is outside of the first combustion chamber, while simultaneously the exhaust outlet is in fluid communication with the second combustion chamber, and the access opening of the second channel is within the second combustion chamber. This may be accomplished by various alternative structures. By way of example only with reference to the figures, the length of the double-faced piston 50, the length of the cylinder 12, the location of the exhaust outlets 18, and the location of the inlet ports 44 in each of the first and second piston rod portions 42, 43 extending from opposite faces of the piston 50 may be arranged such that when the piston is in a combustion stage in a first combustion chamber on one side of the piston, the piston blocks the exhaust outlet from communicating with the first combustion chamber. The closest inlet port 44 to the one side of the piston remains outside of the first combustion chamber, thereby preventing communication of gases between the intake manifold on that one side of the piston and the first combustion chamber.

Simultaneously, the exhaust outlet is in fluid communication with the second combustion chamber on the opposite side of the piston, and inlet ports 44 in the second piston rod portion 43 are located within the second combustion chamber. Similarly, when the piston is in another combustion stage in the second combustion chamber on the opposite side of the piston, the piston blocks the exhaust outlet from communicating with the second combustion chamber. The closest inlet port 44 to the second side of the piston remains outside of the second combustion chamber, thereby preventing communication of gases between the intake manifold on the second side of the piston and the second combustion chamber. Simultaneously, the exhaust outlet is in fluid communication with the first combustion chamber on the first side of the piston, and inlet ports 44 in the first piston rod portion 42 are located within the first combustion chamber.

Following an expansion stroke portion, the piston may continue to move in a momentum stroke portion for a remainder of the stroke. The momentum stroke portion of each stroke encompasses the remaining portion of the stroke following the expansion stroke portion. In accordance with embodiments of the disclosure, substantially the entire momentum stroke portion of the second stroke on the second combustion chamber side of the piston may coincide with compression of gases in the first combustion chamber. That is, the momentum that follows an expansion portion of the stroke in one combustion chamber is used to compress gasses in the other combustion chamber. This may be made possible by an engine structure where an end of an expansion in one combustion chamber does not correspond with a TDC position in an opposing combustion chamber. Rather, the engine design enables further piston travel following an expansion portion of the stroke. In some embodiments, the further piston travel during the momentum portion of the stroke may be at least a width of the piston. In other embodiments it may be multiple times a width of the piston. In yet other embodiments, it may be at least a half a width of the piston.

During the momentum stroke portion of each stroke, gases may be exchanged between the combustion chamber where ignition of combustion gases has just occurred and an area external to the cylinder. The exchange of gases may occur through a passageway in the piston rod portion connected to the piston and extending from a location within the at least one combustion chamber to an area external to the cylinder, and through the exhaust ports formed in the peripheral wall of the cylinder. By way of one example with reference to FIGS. 2-7, the positions of the piston 50 and the piston rod portions 42 are shown during a first stroke from the far left position of the piston in FIG. 2 to the far right position of the piston in FIG. 7. FIGS. 7-12 show the positions of the piston 50 and the piston rod portions 42 during a second stroke from the far right position of the piston in FIG. 7 to the far left position of the piston in FIG. 12. The far left and far right positions of the piston in the cylinder 12 may be referred to as Top Dead Center (TDC) for the stroke in which the combustion gases have been compressed and ignition of the gases at the beginning of a combustion phase is occurring. When the piston is in the far left position of FIG. 2 and ignition is occurring for the combustion gases that have been compressed into a clearance volume between the left face of the piston and the cylinder head 15 at the left end of the cylinder, the piston is at TDC for the stroke from the left end to the right end of the cylinder as viewed in FIGS. 2-7. Similarly, when the piston is in the far right position of FIG. 7 and ignition is occurring for the combustion gases that have been compressed into a clearance volume between the right face of the piston and the cylinder head 14 at the right end of the cylinder, the piston is at TDC for the stroke from the right end to the left end of the cylinder as viewed in FIGS. 7-12.

As the piston continues to move from TDC for a stroke from the left end of the cylinder to the right end of the cylinder, FIG. 3 illustrates the piston at a position where the piston has just passed the centrally located exhaust ports 18. At this point, a first combustion chamber on the left side of the piston is now in fluid communication with the centrally located exhaust ports 18 and exhaust gases from the combustion may start to exit the combustion chamber. Therefore, the expansion stroke portion of the stroke has ended, and the piston is continuing to travel toward the right end of the cylinder in the momentum stroke portion as a result of inertia remaining after the end of the expansion stroke.

Figure 4:
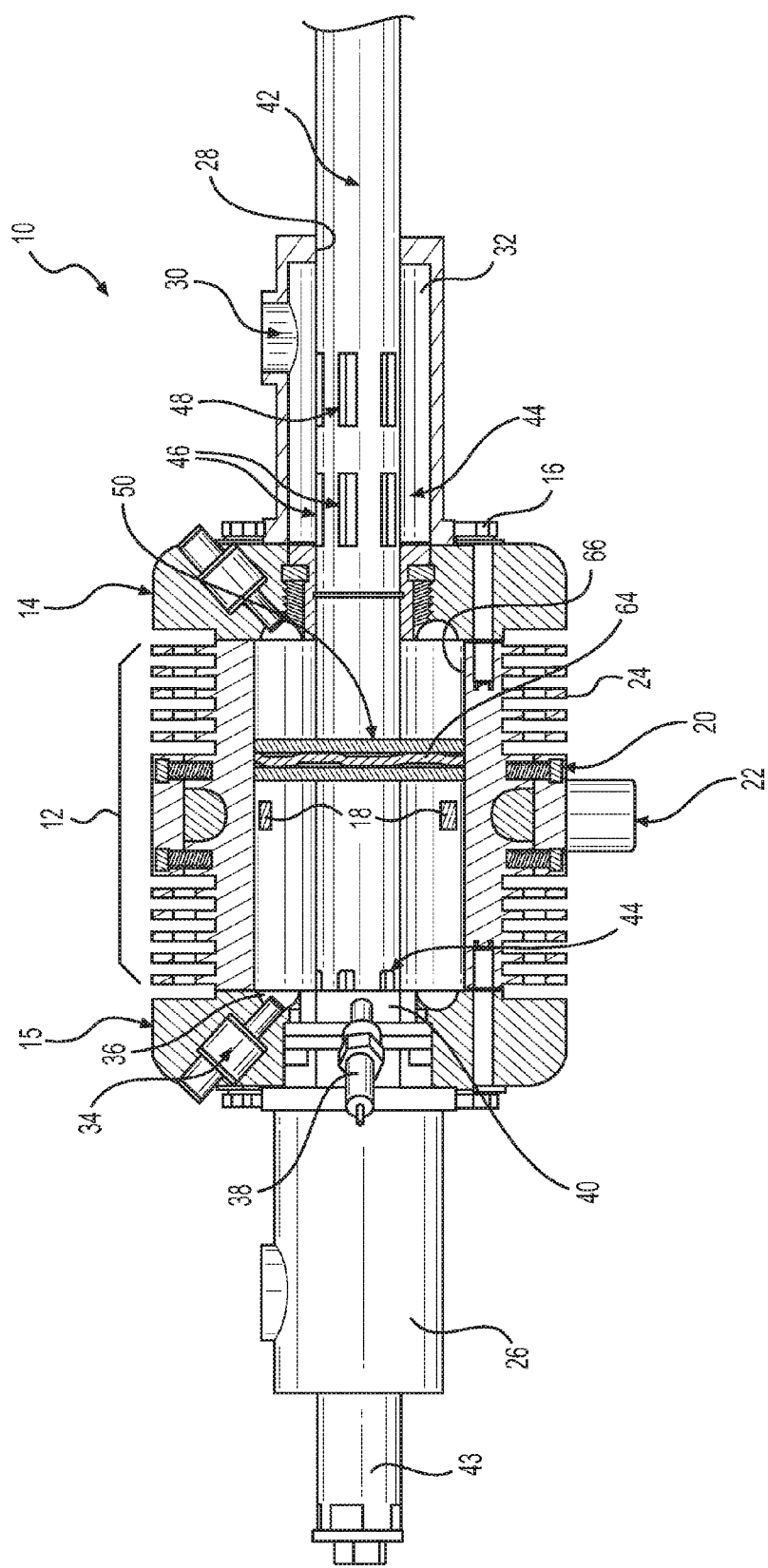
FIG. 4 is a partial cross-sectional view of the engine of FIG. 1 as compression continues on a right side of the cylinder beyond the compression illustrated in FIG. 3.

As shown in FIGS. 3 and 4, the double-faced piston 50, the first piston rod portion 43 on the left side of the piston and the centrally located exhaust ports 18 may be configured such that the double-faced piston passes the centrally located exhaust ports 18 as the piston moves from the left end of the cylinder toward the right end of the cylinder before the inlet ports 44 closest to the left face of the piston enter the first combustion chamber on the left side of the piston. As shown in FIG. 4, the piston 50 has moved completely to the right of the centrally located exhaust ports 18 by the time inlet ports 44 in the left piston rod portion 42 are entering the combustion chamber on the left side of the piston to permit gas flow between the combustion chamber and the inlet ports 44. This relative sizing and spacing of the various components allows exhaust gases generated in the first combustion chamber to begin exiting from the centrally located exhaust ports 18 before fresh pre-compressed air or other combustion gases are introduced into the first combustion chamber through the piston rod portion 43 on the left side of the piston. In various alternative embodiments, the precise placement of the inlet ports through piston rod portions 42, 43 relative to the opposite faces of the double-faced piston may be varied such that the closest inlet port to each face of the piston enters the respective combustion chamber on the same side of the piston shortly after the face of the piston has passed the near edge of the centrally located exhaust ports, thereby allowing exhaust gases to begin exiting the respective combustion chamber a short time before introduction of the fresh pre-compressed air or other combustion gases (see e.g., FIGS. 4 and 9).

Shortly after the piston has passed the centrally located exhaust ports 18 during the momentum stroke portion of the stroke from the left end of the cylinder to the right end of the cylinder, as shown in FIG. 4, the edges of the inlet ports 44 in the piston rod portion 43 that are closest to the left face of the piston start to enter the left combustion chamber. At this point a scavenging phase may occur on the left side of the piston as a result of pre-compressed gases being introduced into the left combustion chamber through the piston rod portion 43 and inlet ports 44. The inlet ports 44 are configured such that when the piston is in the momentum stroke portion of the first stroke from the left end to the right end of the cylinder, gas flow may be continuously communicated between the left combustion chamber and an area external to the cylinder. In the exemplary embodiment shown in the figures, fresh, pre-compressed air may be introduced into the left combustion chamber from the intake manifold 26 located opposite the cylinder head or integral with the cylinder head on the left end of the cylinder. Simultaneously, exhaust gases may be scavenged from the left combustion chamber by the incoming pre-compressed air or other gases and forced out of the centrally located exhaust ports 18.

Some aspects of the invention may involve the cylinder and the double-faced piston being sized such that the expansion stroke portion of the first stroke on a first side of the piston as the piston moves from the first end of the cylinder to the second end of the cylinder coincides with at least one of a scavenging phase and a gas boost phase on a second side of the piston. A similar coincidence may occur in connection with the second stroke. By way of non-limiting example with reference to the figures, as the piston continues to move toward the right end of the cylinder, as shown in FIGS. 5 and 6, gas flow may be continuously communicated between the left combustion chamber and an area external to the cylinder. The continuous flow of pre-compressed air or other gases introduced from the inlet manifold 26 into the combustion chamber may assist with cooling of the cylinder as well as scavenging of exhaust gases from the combustion chamber, and boosting the gas pressure within the left combustion chamber. A similar coincidence is illustrated for the second stroke in FIGS. 11 and 12. In some embodiments, the coincidence of compression on one side with scavenging and gas boost on the other side may precisely correspond. In other embodiments they may substantially overlap.

Some aspects of the invention may involve the cylinder and the double-faced piston being sized such that the momentum stroke portion of the first stroke on a first side of the piston as the piston moves from the first end of the cylinder to the second end of the cylinder coincides with a compression phase in the second combustion chamber on a second side of the piston. By way of non-limiting example, simultaneously with the momentum stroke portion of the first stroke from the left end of the cylinder to the right end of the cylinder, after the piston has moved past the centrally located exhaust ports 18 toward the right end of the cylinder, gases on the right side of the piston are compressed during a compression phase on the right side of the piston. When the piston is all the way to the right, as shown in FIG. 7, the combustion gases on the right side of the piston will have been compressed into the remaining clearance volume of the right combustion chamber and ignition will occur to begin the second stroke.

As best seen by way of non-limiting example in FIGS. 2-12, the cylinder 12 and the double-faced piston 50 may be sized such that a total distance the piston travels during the first stroke from the left end of the cylinder to the right end of the cylinder, or during the second stroke from the right end of the cylinder to the left end of the cylinder may be substantially greater than a distance the piston 50 travels during the expansion stroke portion of either stroke. In some exemplary embodiments the cylinder and the double-faced piston may be sized such that the total distance the piston travels during each stroke from one end of the cylinder to the opposite end of the cylinder may exceed the distance the piston travels during the expansion stroke portion of the stroke by at least the length of the piston from one face to the opposite face. In other exemplary embodiments the cylinder and the double-faced piston may be sized such that a total distance the piston travels in each stroke exceeds by at least the length of the piston a distance traveled by the piston during compression of gases on one side of the piston. The length of the piston 50 from one face to the opposite face in the exemplary embodiment shown in the figures may be less than ½ of a distance from at least one of the cylinder heads 14 to the centrally located exhaust ports 18. This configuration and relative sizing of the piston and cylinder allows for a significantly greater length of the total stroke for the piston in each direction during which fresh pre-compressed air or other gases may be introduced into the cylinder for the purposes of scavenging exhaust gases and cooling the cylinder after each combustion occurs at opposite ends of the cylinder.

At the beginning of an expansion stroke portion of a stroke from the right end of the cylinder to the left end, as shown in FIG. 7, gas flow may occur between the combustion chamber on the left side of the piston and the inlet manifold 26 on the left side of the cylinder, and between the combustion chamber on the left side of the piston and the exhaust manifold 20 through the exhaust ports 18. The communication of gases between the combustion chamber on the left side of the piston and the exhaust manifold may continue until the left face of the piston has moved past the centrally located exhaust ports 18, acting as an exhaust valve and shutting off communication between the left combustion chamber and the exhaust manifold. Additionally, before the piston 50 has even closed off the exhaust ports 18, the inlet ports 44 closest to the left face of the piston will have moved outside of the left combustion chamber, thereby closing off communication of gases between the left inlet manifold 26 and the left combustion chamber through the left piston rod portion 43.

The length of the double-faced piston 50, the length of the cylinder 12, the location of the exhaust outlets 18, and the location of the inlet ports 44 in each of the first and second piston rod portions 42, 43 extending from opposite faces of the piston 50 may be arranged such that when the piston is in a combustion stage in the second combustion chamber on the right side of the piston, the piston blocks the exhaust outlet from communicating with the second combustion chamber. The closest inlet port 44 to the right side of the piston remains outside of the second combustion chamber, thereby preventing communication of gases between the intake manifold on the right side of the piston and the second combustion chamber. Simultaneously, the exhaust outlet is in fluid communication with the first combustion chamber on the left side of the piston, and inlet ports 44 in the left piston rod portion 43 are located within the first combustion chamber.

The momentum stroke portion of each stroke encompasses the remaining portion of the stroke following the expansion stroke portion. During the momentum stroke portion of each stroke, gases may be exchanged between the combustion chamber where ignition of combustion gases has just occurred and an area external to the cylinder. The exchange of gases may occur through a passageway in the piston rod portion connected to the piston and extending from a location within the at least one combustion chamber to an area external to the cylinder, and through the exhaust ports formed in the peripheral wall of the cylinder. FIGS. 7-12 show the positions of the piston 50 and the piston rod portions 42 during a second stroke from the far right position of the piston in FIG. 7 to the far left position of the piston in FIG. 12. As discussed above, the far left and far right positions of the piston in the cylinder 12 may be referred to as Top Dead Center (TDC) for the stroke in which the combustion gases have been compressed and ignition of the gases at the beginning of a combustion phase is occurring. When the piston is in the far right position of FIG. 7 and ignition is occurring for the combustion gases that have been compressed into a clearance volume between the right face of the piston and the cylinder head 14 at the right end of the cylinder, the piston is at TDC for the stroke from the right end to the left end of the cylinder, as viewed in FIGS. 7-12.

Figure 8:
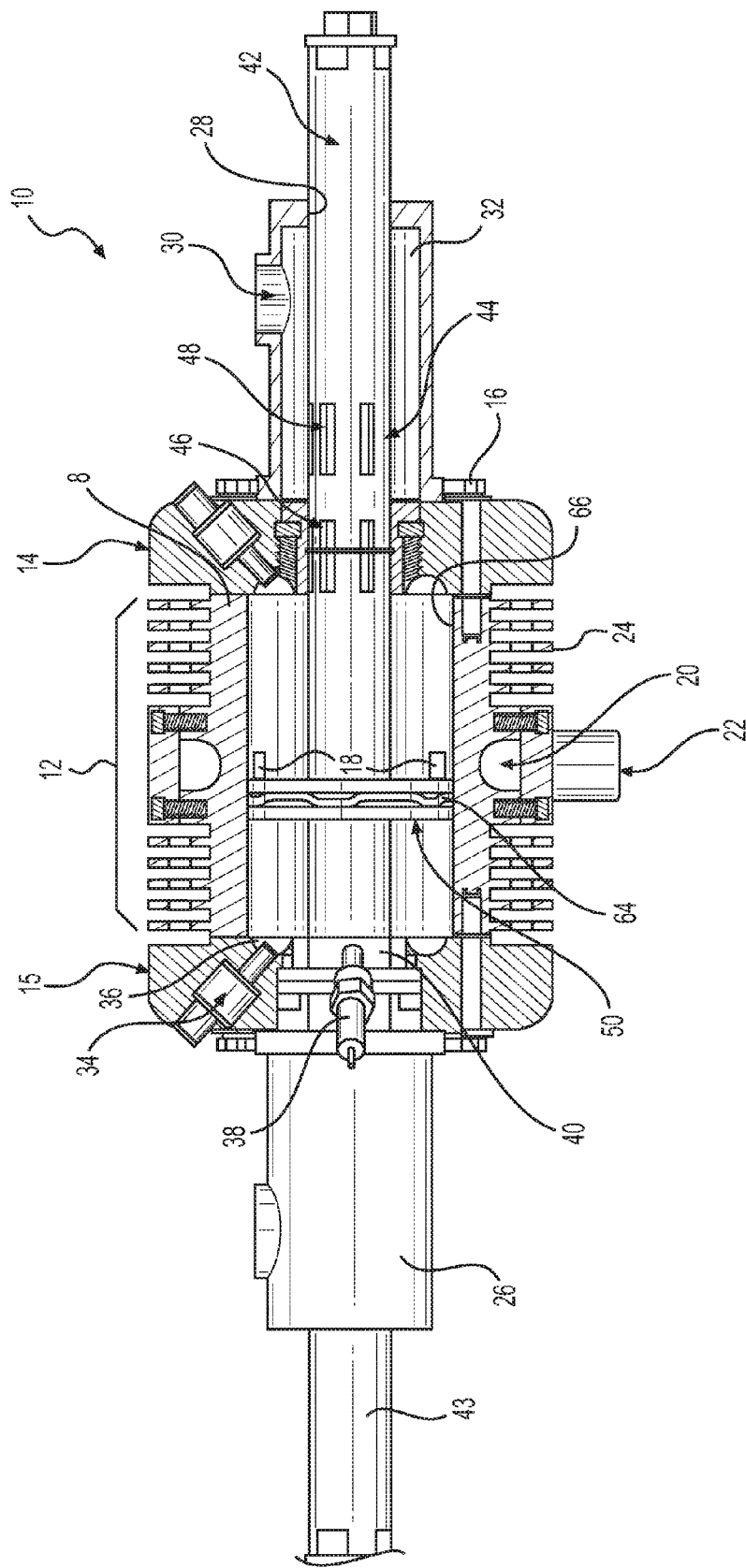
FIG. 8 is a partial cross-sectional view of the engine of FIG. 1 with the piston in a momentum portion of the stroke, in an early stage of compressing gasses on the left side of the cylinder.

As the piston continues to move from TDC for a stroke from the right end of the cylinder to the left end of the cylinder, FIG. 8 illustrates the piston at a position where the piston has just passed the centrally located exhaust ports 18. At this point, the second combustion chamber on the right side of the piston is now in fluid communication with the centrally located exhaust ports 18 and exhaust gases from the combustion that occurred on the right side of the piston during the expansion stroke portion of the second stroke may start to exit the combustion chamber. Therefore, the expansion stroke portion of the second stroke has ended, and the piston is continuing to travel toward the left end of the cylinder in the momentum stroke portion as a result of inertia remaining after the end of the expansion stroke.

Figure 9:
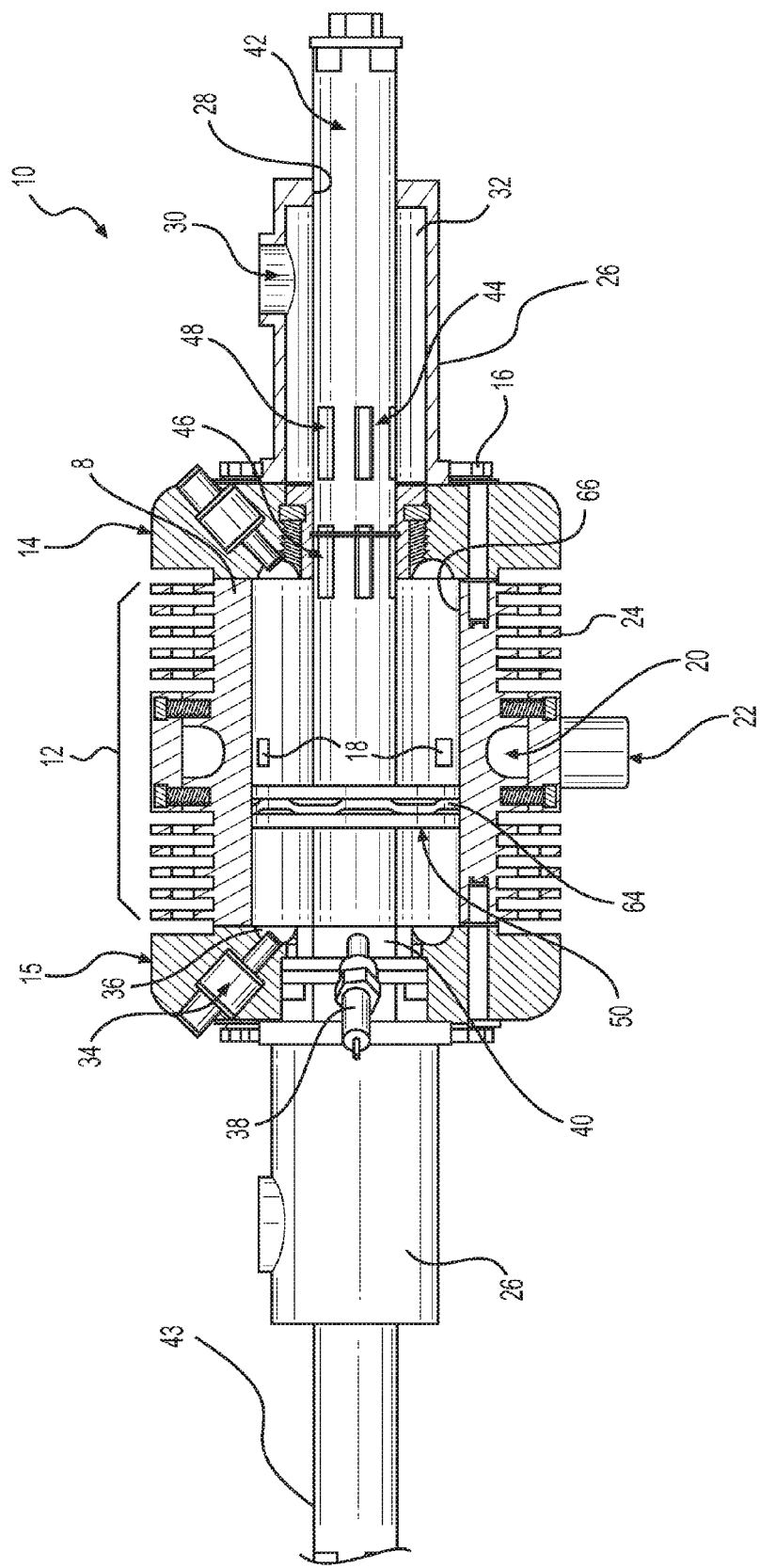
FIG. 9 is a partial cross-sectional view of the engine of FIG. 1 as compression continues on a left side of the cylinder beyond the compression illustrated in FIG. 8.

As shown in FIGS. 8 and 9, the double-faced piston 50, the second piston rod portion 42 on the right side of the piston and the centrally located exhaust ports 18 may be configured such that the double-faced piston passes the centrally located exhaust ports 18 as the piston moves from the right end of the cylinder toward the left end of the cylinder before the inlet ports 44 closest to the right face of the piston enter the second combustion chamber on the right side of the piston. As shown in FIG. 9, the piston 50 has moved completely to the left of the centrally located exhaust ports 18 by the time inlet ports 44 in the right piston rod portion 42 are entering the second combustion chamber on the right side of the piston to permit gas flow between the second combustion chamber and the inlet ports 44. This relative sizing and spacing of the various components allows exhaust gases generated in the second combustion chamber to begin exiting from the centrally located exhaust ports 18 before fresh pre-compressed air or other combustion gases are introduced into the second combustion chamber through the piston rod portion 42 on the right side of the piston. In various alternative embodiments, the precise placement of the inlet ports through piston rod portions 42, 43 relative to the opposite faces of the double-faced piston may be varied such that the closest inlet port to each face of the piston enters the respective combustion chamber on the same side of the piston shortly after the face of the piston has passed the near edge of the centrally located exhaust ports, thereby allowing exhaust gases to begin exiting the respective combustion chamber a short time before introduction of the fresh pre-compressed air or other combustion gases.

Shortly after the piston has passed the centrally located exhaust ports 18 during the momentum stroke portion of the stroke from the right end of the cylinder to the left end of the cylinder, as shown in FIG. 9, the edges of the inlet ports 44 in the piston rod portion 42 that are closest to the right face of the piston start to enter the second combustion chamber. At this point a scavenging phase may occur on the right side of the piston as a result of pre-compressed gases being introduced into the second combustion chamber through the piston rod portion 42 and inlet ports 44. The inlet ports 44 are configured such that when the piston is in the momentum stroke portion of the second stroke from the right end to the left end of the cylinder, gas flow may be continuously communicated between the second combustion chamber and an area external to the cylinder. In the exemplary embodiment shown in the figures, fresh, pre-compressed air may be introduced into the second combustion chamber from the intake manifold 26 located opposite the cylinder head or integral with the cylinder head on the right end of the cylinder. Simultaneously, exhaust gases may be scavenged from the second combustion chamber on the right side of the piston 50 by the incoming pre-compressed air or other gases and forced out of the centrally located exhaust ports 18.

Figure 11:
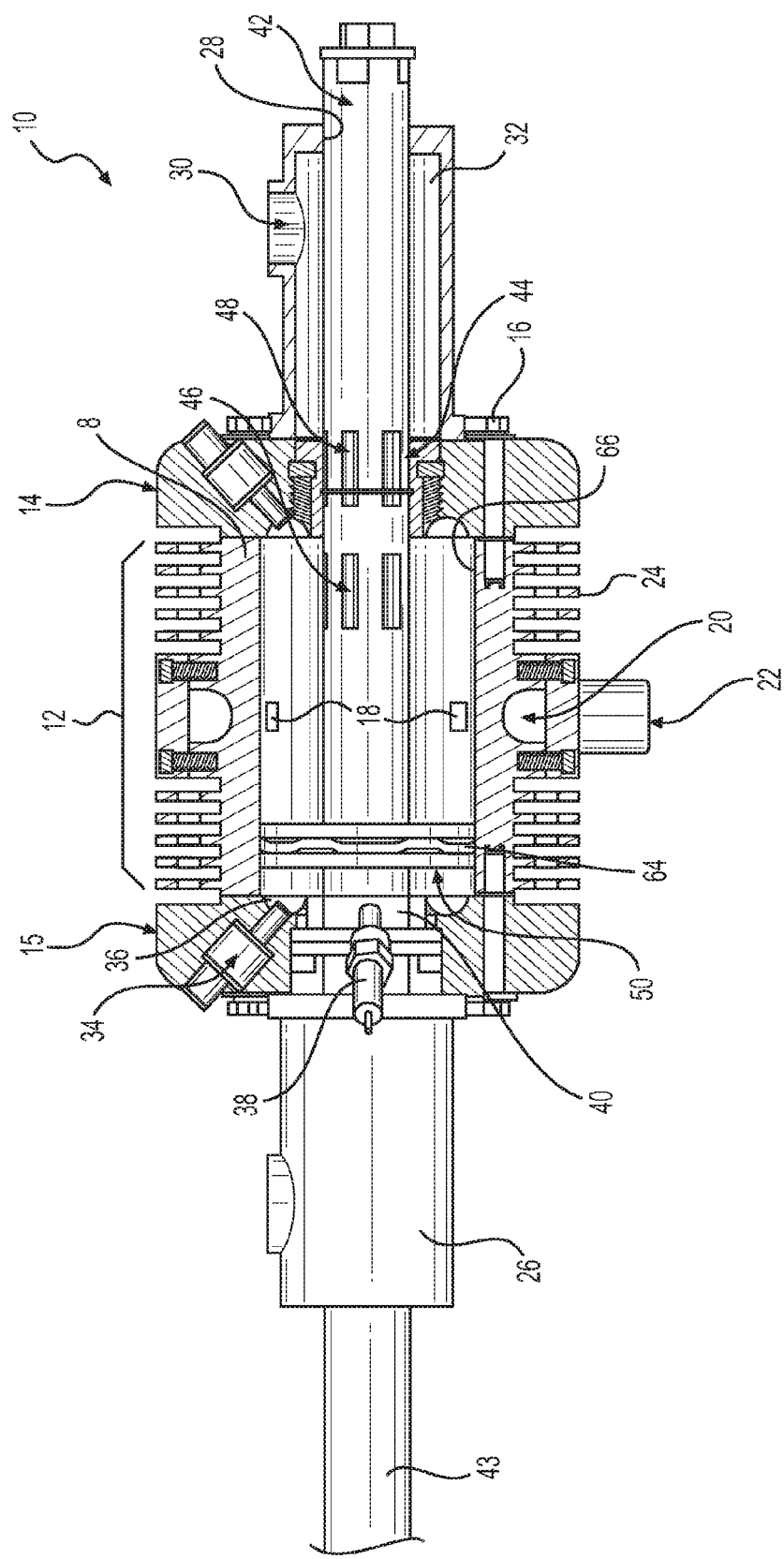
FIG. 11 is a partial cross-sectional view of the engine of FIG. 1 in an even more advanced stage of compression on the left side of the cylinder beyond the compression illustrated in FIG. 10.

As the piston continues to move toward the left end of the cylinder, as shown in FIGS. 10 and 11, gas flow may be continuously communicated between the second combustion chamber and an area external to the cylinder. The continuous flow of pre-compressed air or other gases introduced from the inlet manifold 26 into the second combustion chamber may assist with cooling of the cylinder as well as scavenging of exhaust gases from the second combustion chamber, and boosting the gas pressure within the second combustion chamber. Simultaneously with the momentum stroke portion of the second stroke from the right end of the cylinder to the left end of the cylinder, after the piston has moved past the centrally located exhaust ports 18 toward the left end of the cylinder, gases on the left side of the piston are compressed during a compression phase on the left side of the piston. When the piston is all the way to the left, as shown in FIG. 2, the combustion gases on the left side of the piston will have been compressed into the remaining clearance volume of the left combustion chamber and ignition will occur to begin another stroke from the left end of the cylinder to the right end of the cylinder.

Figure 12:
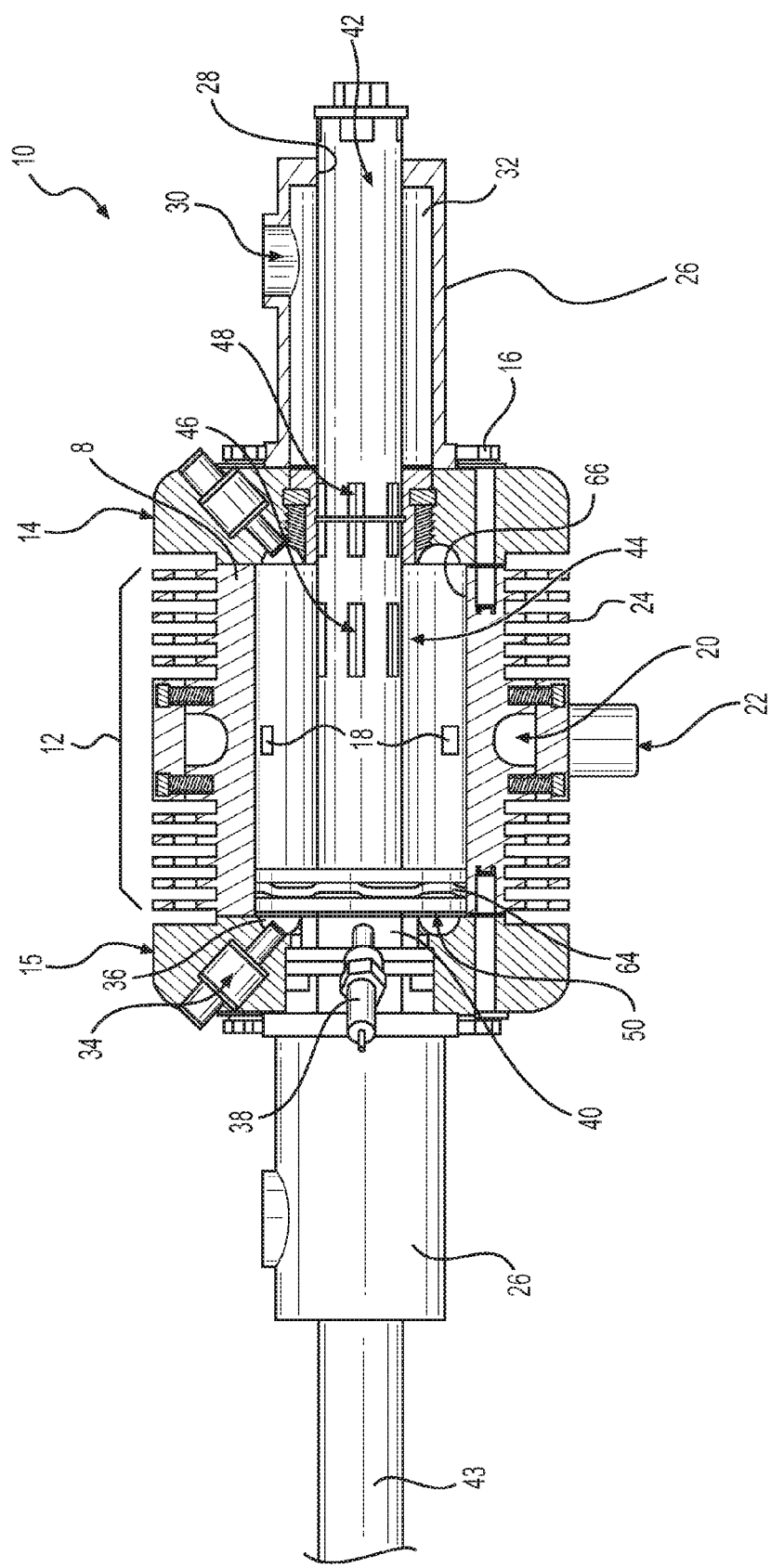
FIG. 12, similar to FIG. 2, illustrates top dead center piston position on the left side of the cylinder.

In accordance with some embodiments of the invention, regardless of other particular structures in the engine, a cylinder and a double-faced piston may be sized such that a total distance the piston travels during a first stroke is substantially greater than a distance the piston travels during an expansion stroke portion of the first stroke. By way of example with reference to FIGS. 7-12, the total distance of piston travel may be measured from TDC on the right side of the engine 10, as illustrated in FIG. 7, to TDC on the left side of engine 10, as illustrated in FIG. 12. This total distance traveled is substantially greater than the expansion portion of the stroke which occurs when, in the progression of FIGS. 7-12, the piston 50 passes at least one of the exhaust ports 18. It is contemplated that in other embodiments of the invention, the end of the expansion stroke might be marked by other occurrences, such as the opening of a mechanical valve, or the cessation of expansion in some other manner Regardless of how the expansion stroke portion ends, such embodiments are contemplated to be within the scope of this disclosure so long as the total distance of travel is substantially greater than the expansion portion alone. By way of non-limiting examples, the total distance may be considered substantially greater if the difference between the expansion portion of the stroke and a non-expansion portion of the stroke is either multiple times the width of the piston, the width of the piston, greater than three quarters the width of the piston, greater than half the width of the piston, or greater than a quarter width of the piston. Thus, for example, the double-faced piston may have an axial length from one face of the piston to an opposite face of the piston that is less than or equal to ½ of a distance from at least one of the first cylinder head and the second cylinder head to the exhaust port.

In some exemplary embodiments the cylinder and the double-faced piston may be sized such that the total distance the piston travels during each stroke from one end of the cylinder to the opposite end of the cylinder may exceed the distance the piston travels during the expansion stroke portion of the stroke by at least the length of the piston from one face to the opposite face. In other exemplary embodiments the cylinder and the double-faced piston may be sized such that a total distance the piston travels in each stroke exceeds by at least the length of the piston a distance traveled by the piston during compression of gases on one side of the piston. The length of the piston 50 from one face to the opposite face in the exemplary embodiment shown in the figures may be less than ½ of a distance from at least one of the cylinder heads 14 to the centrally located exhaust ports 18. This configuration and relative sizing of the piston and cylinder may allow for a significantly greater length of the total stroke for the piston in each direction during which fresh pre-compressed air or other gases may be introduced into the cylinder for the purposes of scavenging exhaust gases and cooling the cylinder after each combustion occurs at opposite ends of the cylinder.

In accordance with some embodiments of the invention, an internal combustion engine may include a piston being formed of an assembly of separate pieces, including a pair of piston end disks, each having a first outer diameter, and wherein the center disk is configured to cause a thermal gap between the pair of piston end disks. By way of example, and as shown in FIGS. 13 to 22, various embodiments of an engine according to this disclosure may include a double-faced piston 50. The piston 50 may include a cylindrical first piston portion 56 having a first diameter, a cylindrical second piston portion 54 of the first diameter, and a cylindrical third piston portion 52 of a second diameter less than the first diameter. The cylindrical third piston portion 52 may be located between the first piston portion 56 and the second piston portion 54, and the first piston portion 56 may be configured such that prior to assembly, the first piston portion 56 is separate from the second piston portion 52.

In accordance with some embodiments, the hardness of the center disk differs from the hardness of the end disks. In addition, or alternatively, the piston center disk may be integrally formed with one of the pair of piston end disks.

Embodiments may also include a continuous, gapless piston ring circumscribing a piston portion, where the piston ring is configured such that when heated the piston ring deforms in an axial direction of the piston. Variously shaped piston rings may be employed consistent with embodiments of the invention. Such shapes may include a wave pattern or other meandering constructions that are either symmetrical or non-symmetrical. As illustrated by way of example only in FIG. 20, a continuous, gapless piston ring 64 may circumscribe the third piston portion 52, where the piston ring 64 is configured such that when heated, the piston ring deforms in an axial direction of the piston 50. The third piston portion 52 may define a slot between the first piston portion 56 and the second piston portion 54. The slot defined between the first piston portion 56 and the second piston portion 54 may also form a thermal gap that is not completely filled by the piston ring, and that therefore facilitates heat transfer away from the piston ring, thereby increasing its longevity. In some embodiments prior to assembly, the third piston portion 52 may be integral with the first piston portion 56, and the second piston portion 54 may be non-integral with the third piston portion 52.

Figure 19:
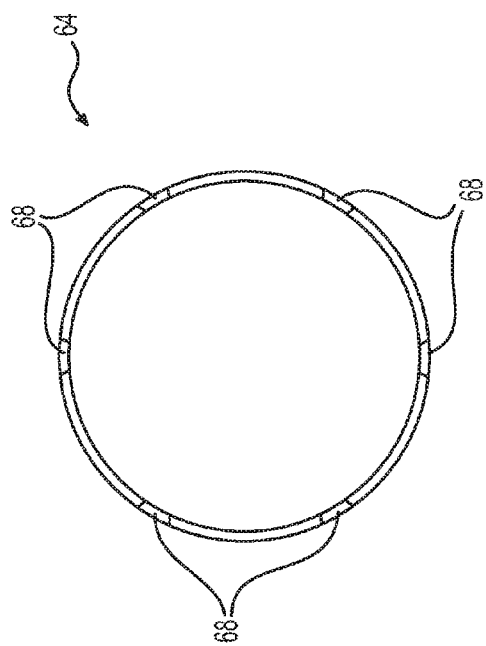
FIG. 19 is a plan view of the piston ring of FIG. 17.
Figure 17:
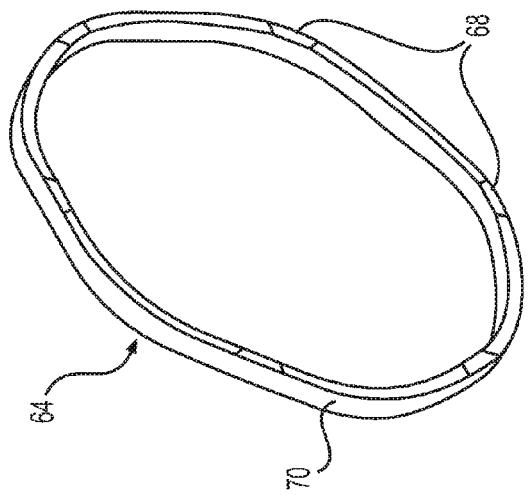
FIG. 17 is a perspective view of a piston ring that may be used with the piston assembly of FIG. 13.
Figure 20:
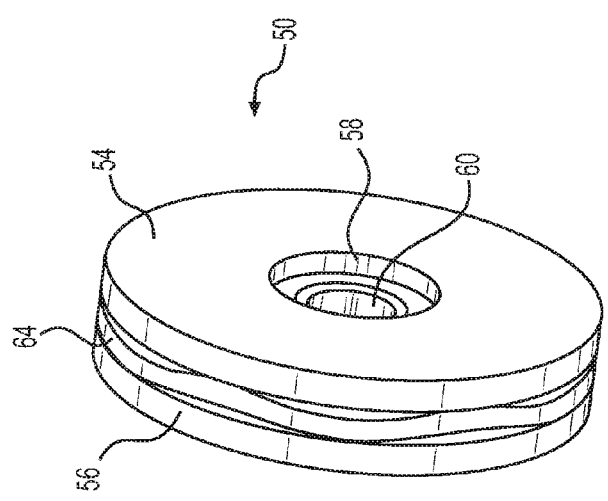
FIG. 20 is a perspective view of the piston assembly of FIG. 13 with the piston ring of FIG. 17.
Figure 21:
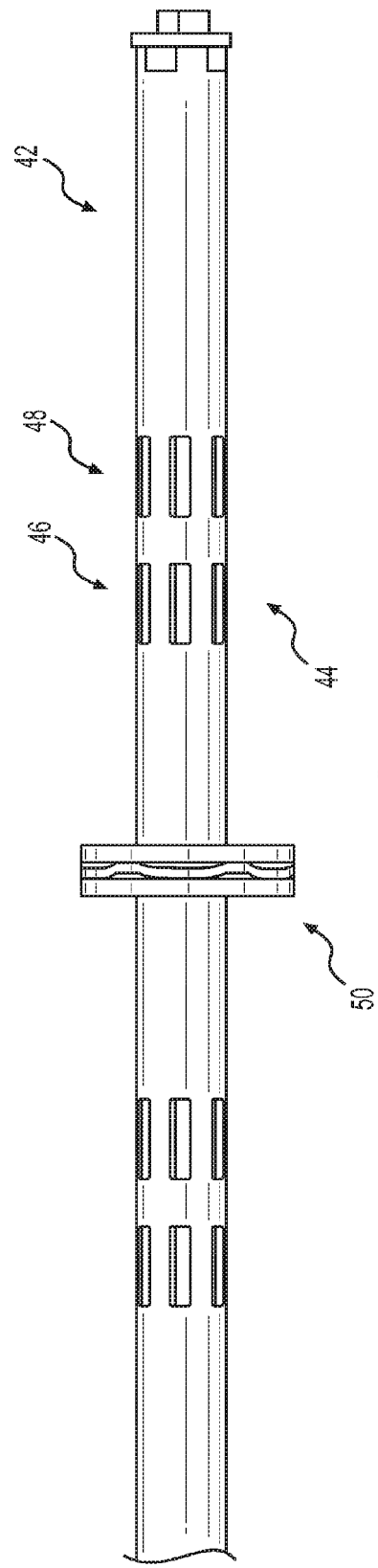
FIG. 21 is a side view of the piston assembly and piston ring of FIG. 20 assembled on the piston rods of FIG. 2.

As shown in FIG. 13, a groove in the outer peripheral wall of the piston 50 may be defined by the assembly of the first, second, and third piston portions, as described above, or may be machined or otherwise manufactured, e.g., using 3D additive manufacturing processes. The groove may include a first edge and a second edge spaced from the first edge. A piston ring 64 (FIGS. 17-20) may be installed in the groove, and the piston ring may have a shape that meanders within the groove, such that the shape of the piston ring differs from a shape of the groove and such that the piston ring does not substantially fill the groove. The piston ring 64 may be constructed of a material that when subjected to heat causes a shape of the meanderings to change, thereby enabling the piston ring to expand in an axial direction of the piston, between the edges of the groove. As best seen in FIGS. 17, 19, and 20, the meanderings of the piston ring 64 may be in the shape of a wave. Peaks of the wave alternatively extend toward opposing edges of the groove. The piston ring 64 may be constructed such that when subjected to heat, the piston ring tends to expand in an axial direction of the piston rather than radially.

As shown in FIGS. 17-20, the piston ring 64 may have an undulating axial cross section and a circular radial cross section. The piston ring 64 may include a plurality of staggered, flat abutment surface portions 68 on axially opposite faces. The flat abutment surface portions 68 may be configured to seat alternately on opposite edges of the groove. A gap between the first and second edges of the groove of the piston 50 may allow for axially-directed expansion and contraction of the piston ring 64 while maintaining a circular radial cross section of the piston ring having a substantially constant outer diameter 70 that remains in full contact with an inner peripheral wall of the cylinder 12 at all times.

In a plan view of the piston ring 64, as can be clearly seen in FIG. 19, the piston ring 64 is round, in order to fit tightly against a cylinder wall 66. In one exemplary embodiment, each side of the piston ring 64 may be provided with six evenly peripherally distributed flat abutment surface portions 68 for abutting the piston ring 64 against the adjacent piston portion, i.e., the first piston portion 56 and the second piston portion 54. The abutment surface portions 68 of one side of the piston ring 64 may be angularly shifted with respect to the abutment surface portions 68 of the other side of the piston ring 64, such that each abutment surface portion 68 of one side of the piston ring 64 is equally distanced from the two adjacent abutment surface portions 68 of the other side of the piston ring 64.

Figure 18:
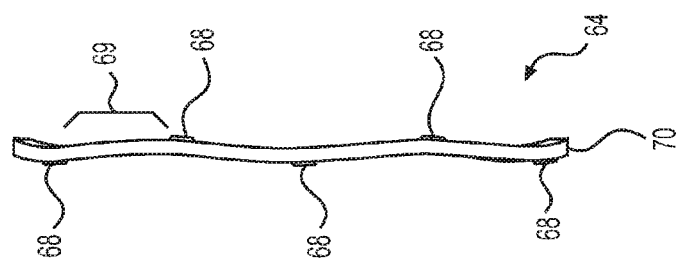
FIG. 18 is a side view of the piston ring of FIG. 17.

As can be seen in FIG. 18, which is a side view of the piston ring 64, a curved ring wall 69 may be formed between two adjacent abutment surface portions 68 of both sides of the piston ring 64.

Depending on construction and materials employed, in some embodiments the above described structure of the piston ring 64 may have several advantages. The piston ring 64 is peripherally continuous, in contrast to traditional piston rings, thus substantially eliminating compression losses during the operation of the engine due to leakage of compressed gas from one side of the piston ring to an opposite side thereof. As a result of the reduction in compression losses, a single piston ring 64 may be used, rather than two or three piston rings, as known in the art. (although multiple rings consistent with this disclosure may be employed on a single piston consistent with this disclosure.) The reduction in the number of piston rings may result in a significant reduction in friction losses caused by the sliding contact between each piston ring and the cylinder wall 66. The reduction in friction losses in turn may result in improvements in the efficiency of the engine 10. The abutment surface portions 68 on both sides of the piston ring 64 may also ensure that the piston ring 64 will remain directed in an orientation substantially perpendicular to the longitudinal axis A, which in turn may result in the ring peripheral surface 70 remaining parallel to the cylinder wall 66 and in a continuous contact therewith. As the piston ring 64 according to various exemplary embodiments of this disclosure is heated during operation and tends to expand, the ring peripheral surface 70 will remain in full contact with the cylinder wall 66, and may exert substantially consistent pressure thereon. Expansion and contraction of the piston ring 64 may result in an increased curvature and axially-directed expansion of the curved ring walls 69, thereby absorbing the expansion without disturbing the constant radial profile of the piston ring 64.

The engine 10 according to the various exemplary embodiments of this disclosure may facilitate a nearly continuous scavenging of hot exhaust gases from the engine while continuously supplying fresh air for combustion. The nearly continuously introduced fresh pre-compressed air may decrease the temperature within the cylinder and increase the engine efficiency and engine service life.

To expedite the foregoing portion of the disclosure, various combinations of elements are described together. It is to be understood, that aspects of the invention in there broadest sense are not limited to the particular combinations previously disclosed. Rather, embodiments of the invention, consistent with this disclosure, and as illustrated by way of example only in the Figures, may include one or more of the following, either alone or in combination with any one or more other of the following, or in combination with the previously disclosed features:

an internal combustion engine.

a cylinder defining at least one combustion chamber in the engine block.

a piston in the cylinder, the piston being configured to travel in a first stroke from one end of the cylinder to an opposite end of the cylinder, and being sized relative to the cylinder to enable an expansion stroke portion of the first stroke wherein the piston travels under gas expansion pressure, and a momentum stroke portion of the first stroke for the remainder of the first stroke following the expansion stroke portion.

at least one piston rod portion connected to the piston and extending from a location within the at least one combustion chamber to an area external to the cylinder.

at least one recess in the piston rod portion, the at least one recess forming a passageway configured to communicate gas flow between the at least one combustion chamber and the area external to the cylinder.

wherein the at least one recess is configured such that when the piston is in the momentum stroke portion of the first stroke following the expansion stroke portion of the first stroke, the at least one recess is configured to continuously communicate gas flow between the at least one combustion chamber and the area external to the cylinder.

wherein the at least one recess forming the passageway renders the at least one piston rod portion at least partially hollow.

wherein the passageway includes a groove in the at least one piston rod portion.

wherein the passageway is configured to introduce combustion gas into the at least one combustion chamber from a location outside the cylinder.

wherein the piston is double-faced and wherein the at least one piston rod portion includes a pair of piston rod portions, each piston rod portion extending from an opposing face of the double-faced piston.

wherein the at least one recess includes a channel extending internal to the at least one piston rod portion.

wherein the pair of piston rod portions are integrally formed.

wherein the pair of piston rod portions are indirectly connected to each other through the double-faced piston.

wherein the at least one recess includes at least two recesses, each extending through a different piston rod portion.

further including at least one port in the at least one piston rod portion and in fluid communication with the passageway.

wherein the at least one port includes multiple elongated slots.

wherein the at least one port includes multiple holes in the piston rod.

wherein the passageway includes a plurality of grooves formed in an outer peripheral surface of the at least one piston rod portion.

wherein the at least one recess in the piston rod portion includes a rod section of reduced diameter.

wherein the at least one combustion chamber includes a first combustion chamber defined between a first end of the piston and a first end of the cylinder, and a second combustion chamber defined between a second end of the piston and a second end of the cylinder.

wherein the cylinder is closed at each opposite end by a cylinder head.

wherein the at least one piston rod portion includes a first piston rod portion extending from the first end of the piston through the cylinder head at the first end of the cylinder, and a second piston rod portion extending from the second end of the piston through the cylinder head at the second end of the cylinder.

wherein the cylinder head at each end of the cylinder includes an intake manifold, wherein the passageway in the first piston rod portion is configured to communicate gas flow between the first combustion chamber and the intake manifold at the first end of the cylinder, and the passageway in the second piston rod portion is configured to communicate gas flow between the second combustion chamber and the intake manifold at the second end of the cylinder.

wherein a peripheral wall of the cylinder between the first and second ends of the cylinder includes at least one exhaust port.

wherein the at least one exhaust port includes a plurality of exhaust ports spaced around the circumference of the cylinder, and wherein the plurality of exhaust ports are in fluid communication with an exhaust manifold.

wherein substantially the entire expansion stroke portion of the first stroke on the first combustion chamber side of the piston coincides with gas flow between the second combustion chamber and the intake manifold at the second end of the cylinder.

wherein substantially the entire momentum stroke portion of the first stroke on the first combustion chamber side of the piston coincides with compression of gases in the second combustion chamber.

wherein the piston is further configured to travel in a second stroke from the second end of the cylinder to the first end of the cylinder, and being sized relative to the cylinder to enable an expansion stroke portion of the second stroke wherein the piston travels under gas expansion pressure, and a momentum stroke portion of the second stroke for the remainder of the second stroke following the expansion stroke portion.

wherein substantially the entire expansion stroke portion of the second stroke on the second combustion chamber side of the piston coincides with gas flow between the first combustion chamber and the intake manifold at the first end of the cylinder.

wherein substantially the entire momentum stroke portion of the second stroke on the second combustion chamber side of the piston coincides with compression of gases in the first combustion chamber.

a double-faced piston slidably mounted within the cylinder and configured to move in a first stroke from the first end of the cylinder to the second end of the cylinder, wherein the double-faced piston and the cylinder are configured such that the first stroke includes an expansion stroke portion during which chemical energy from combustion in the first combustion chamber is converted into mechanical power of the piston, and a momentum stroke portion during which the piston continues to move to the second end of the cylinder and gases are exchanged between the first combustion chamber and a location outside the cylinder.

wherein the cylinder and the double-faced piston are sized such that a total distance the piston travels during the first stroke is substantially greater than a distance the piston travels during the expansion stroke portion of the first stroke.

wherein the cylinder and the double-faced piston are sized such that the total distance the piston travels during the first stroke exceeds the distance the piston travels during the expansion stroke portion of the first stroke by at least the length of the piston from one face to the opposite face.

wherein the cylinder and the double-faced piston are sized such that the expansion stroke portion of the first stroke on a first side of the piston as the piston moves from the first end of the cylinder to the second end of the cylinder coincides with at least one of a scavenging phase and a gas boost phase on a second side of the piston.

wherein the cylinder and the double-faced piston are sized such that the momentum stroke portion of the first stroke on a first side of the piston as the piston moves from the first end of the cylinder to the second end of the cylinder coincides with a compression phase in the second combustion chamber on a second side of the piston.

wherein the double-faced piston is configured to move in a second stroke from the second end of the cylinder to the first end of the cylinder, and wherein the cylinder and the double-faced piston are sized such that the second stroke includes an expansion stroke portion during which chemical energy from combustion in the second combustion chamber is converted into mechanical power of the piston, and a momentum stroke portion during which the piston continues to move to the first end of the cylinder and gases are exchanged between the second combustion chamber and a location outside the cylinder.

wherein the cylinder and the piston are sized such that a total distance the piston travels during the second stroke is substantially greater than a distance the piston travels during the expansion portion of the second stroke.

wherein the total distance the piston travels during the second stroke exceeds the distance the piston travels during the expansion stroke portion of the second stroke by at least the length of the piston from one face to the opposite face.

wherein the expansion stroke portion of the second stroke on a second side of the piston as the piston moves from the second end of the cylinder to the first end of the cylinder coincides with at least one of a scavenging phase and a gas boost phase on a first side of the piston.

wherein the momentum portion of the second stroke on a second side of the piston as the piston moves from the second end of the cylinder to the first end of the cylinder coincides with a compression phase in the first combustion chamber on a first side of the piston.

a first piston rod portion connected to a first face of the double-faced piston and extending from a location within the first combustion chamber to a first location outside the cylinder.

a second piston rod portion connected to a second face of the double-faced piston and extending from a location within the second combustion chamber to a second location outside the cylinder.

at least one recess in the first piston rod portion, the at least one recess forming a passageway configured to communicate gas flow between the first combustion chamber and the first location outside the cylinder.

at least one recess in the second piston rod portion, the at least one recess forming a passageway configured to communicate gas flow between the second combustion chamber and the second location outside the cylinder.

at least one port in a peripheral side wall of the cylinder, the at least one port being configured to communicate gas flow between the first combustion chamber and outside the cylinder when the piston is on the second combustion chamber side of the at least one port, and being configured to communicate gas flow between the second combustion chamber and outside the cylinder when the piston is on the first combustion chamber side of the at least one port.

wherein the passageways in the first and second piston rod portions are configured to intake gases into the first and second combustion chambers, respectively, and the at least one port in a peripheral side wall of the cylinder is configured to exhaust gases from the first and second combustion chambers, respectively.

wherein each of the first stroke and the second stroke includes an expansion stroke portion during which chemical energy from combustion in one of the first combustion chamber and the second combustion chamber is converted into mechanical power of the piston, and a momentum stroke portion during which the piston continues to move toward a respective end of the cylinder and gases are exchanged between one of the first combustion chamber and the second combustion chamber and a location outside the cylinder.

wherein the cylinder and the piston are sized such that a total distance the piston travels in each of the first and second strokes exceeds by at least a length of the piston a distance traveled by the piston during compression of gases on one side of the piston.

wherein the cylinder and the piston are sized such that an expansion stroke portion of the first stroke on a first side of the piston as the piston moves from the first end of the cylinder to the second end of the cylinder coincides with at least one of a scavenging phase and a gas boost phase on a second side of the piston.

wherein the cylinder and the piston are sized such that a momentum stroke portion of the first stroke on a first side of the piston as the piston moves from the first end of the cylinder to the second end of the cylinder coincides with compression of gases in the second combustion chamber on a second side of the piston.

at least one port in a peripheral side wall of the cylinder, the at least one port being configured to communicate gas flow between the first combustion chamber and outside the cylinder when the piston is on the second combustion chamber side of the at least one port, and being configured to communicate gas flow between the second combustion chamber and outside the cylinder when the piston is on the first combustion chamber side of the at least one port.

wherein the passageways in the first and second piston rod portions are configured to intake gases into the first and second combustion chambers, respectively, and the at least one port in a peripheral side wall of the cylinder is configured to exhaust gases from the first and second combustion chambers, respectively.

wherein the first passageway and the second passageway are configured to prevent gases from being exchanged between the cylinder and a location outside the cylinder via a path that crosses the first face and the second face.

wherein the first passageway and the second passageway render the first and second piston rod portions at least partially hollow.

wherein at least one of the first and second passageways includes a groove in the respective first and second piston rod portions.

wherein the first and second passageways are configured to introduce combustion gas into the first and second combustion chambers, respectively, from a location outside the cylinder.

wherein the first and second passageways include elongated channels extending internal to the first and second piston rod portions.

wherein the first and second piston rod portions are integrally formed.

wherein the first and second piston rod portions are indirectly connected to each other through the double-faced piston.

further including at least one port in the first piston rod portion in fluid communication with the first passageway and at least one port in the second piston rod portion in fluid communication with the second passageway.

wherein the at least one port in the first and second piston rod portions includes multiple elongated slots.

wherein the at least one port in the first and second piston rod portions includes multiple holes in the piston rod portions.

wherein at least one of the first and second passageways in the first and second piston rod portions includes a plurality of grooves formed in an outer peripheral surface of the respective piston rod portion.

wherein at least one of the first and second recesses in the first and second piston rod portions includes a piston rod section of reduced diameter.

wherein the first passageway in the first piston rod portion and the second passageway in the second piston rod portion are configured to intake gases into the first and second combustion chambers, respectively.

a first piston rod portion extending from a first face of the double-faced piston through the first combustion chamber and through the first cylinder head.

a first recess in the first piston rod portion defining a first passageway for communicating gas between the first combustion chamber and a first location external to the cylinder.

a second piston rod portion extending from a second face of the piston through the second combustion chamber and through the second cylinder head.

a second recess in the second piston rod portion defining a second passageway for communicating gas between the second combustion chamber and a second location external to the cylinder.

at least one port in a peripheral wall of the cylinder, for alternatively communicating gases between at least one region external to the cylinder and at least one of the first combustion chamber and the second combustion chamber.

wherein the double-faced piston, the first piston rod portion, and the at least one port are configured such that the double-faced piston passes the at least one port as the piston moves from the first position toward the second position before an opening of the first recess enters the first combustion chamber to thereby permit gas flow between the first combustion chamber and the first recess in the first piston rod portion.

wherein the double-faced piston, the second piston rod portion, and the at least one port are configured such that the double-faced piston passes the at least one port as the piston moves from the second position toward the first position before an opening of the second recess enters the second combustion chamber to thereby permit gas flow between the second combustion chamber and the second recess in the second piston rod portion.

wherein the first recess in the first piston rod portion and the second recess in the second piston rod portion are configured as inlets for the intake of gases, and the at least one port in the peripheral wall is configured as an outlet for the exhaust of gases.

further including at least one additional recess in the first piston rod portion and at least one additional recess in the second piston rod portion.

wherein the double-faced piston, the first piston rod portion, and the at least one port in the peripheral cylinder wall are configured such that when the double-faced piston is located between the first cylinder head and the at least one port in the peripheral wall, an opening of the first recess is outside the cylinder and the double-faced piston blocks gas flow between the first combustion chamber and the at least one port, and wherein the double-faced piston, the second piston rod portion, and the at least one port in the peripheral cylinder wall are configured such that when the double-faced piston is located between the second cylinder head and the at least one port in the peripheral wall, an opening of the second recess is outside the cylinder and the double-faced piston blocks gas flow between the second combustion chamber and the at least one port in the peripheral wall.

wherein the recesses in the first piston rod portion and the second piston rod portion include a bore through a respective core of each of the first piston rod portion and the second piston rod portion.

wherein the openings of the recesses in the first piston rod portion and the second piston rod portions include a curvilinear port in a respective outer wall of each respective piston rod portion.

wherein the openings of the recesses in the first piston rod portion and the second piston rod portions include an elongated slot in a respective outer wall of each respective piston rod portion.

wherein the recesses in the first and second piston rod portions are defined by regions of reduced diameter.

wherein the at least one port includes an exhaust port located in an axially central region of the cylinder peripheral wall.

wherein during compression and combustion of gases in one of the first and second combustion chambers, the piston acts as an exhaust valve preventing the flow of exhaust gases out of the one of the combustion chambers while enabling the flow of exhaust gases out of the other of the combustion chambers.

an exhaust port located in a peripheral wall of the cylinder at a generally central region of the cylinder between the first cylinder head and the second cylinder head.

at least one combustion gas inlet in a location other than the peripheral cylinder wall, wherein the combustion gas inlet and the exhaust port are configured to cooperate such that combustion gases introduced through the inlet are evacuated from the cylinder through the exhaust port in the peripheral wall.

wherein the double-faced piston has an axial length from one face of the piston to an opposite face of the piston that is less than or equal to ½ of a distance from at least one of the first cylinder head and the second cylinder head to the exhaust port.

further including a first piston rod portion extending from a first face of the double-faced piston through the first combustion chamber and through the first cylinder head, and wherein the at least one combustion gas inlet is located in the first piston rod portion.

further including a second piston rod portion extending from a second face of the double-faced piston through the second combustion chamber and through the second cylinder head, and wherein the at least one combustion gas inlet is located in the second piston rod portion.

wherein the at least one combustion gas inlet includes a first passageway in fluid communication with a first intake manifold located adjacent the first cylinder head and a second passageway in fluid communication with a second intake manifold located adjacent the second cylinder head.

a first elongated channel in the first piston rod portion configured to serve as an intake inlet for gas from a location external to the cylinder, through the first end of the first combustion chamber to a location within the first combustion chamber.

a second elongated channel in the second piston rod portion configured to serve as an intake inlet for gas from a location external to the cylinder, through the second end of the second combustion chamber to a location within the second combustion chamber.

wherein a length of the double-faced piston, a length of the cylinder, a location of the exhaust outlet, and a location of a channel access opening in each of the first and second piston rod portions are arranged such that when the piston is in a combustion stage in the first combustion chamber, the piston blocks the exhaust outlet from communicating with the first combustion chamber and the channel access opening in the first piston rod portion is outside of the first combustion chamber, while simultaneously the exhaust outlet is in fluid communication with the second combustion chamber, and the access opening of the second channel is within the second combustion chamber.

wherein a spacing between a channel access opening in the first piston rod portion and the first face of the piston and the location of the exhaust outlet are configured such that scavenging of combustion gases from the first combustion chamber occurs through the exhaust outlet when a channel access opening in the first piston rod portion is located within the first combustion chamber and the piston is in a position on the second combustion chamber side of the exhaust outlet.

wherein a spacing between a channel access opening in the first piston rod portion and the first face of the piston and the location of the exhaust outlet are configured such that gas boost in the first combustion chamber follows scavenging of combustion gases from the first combustion chamber as pre-charged air continues to be introduced through the channel access opening in the first piston rod portion into the first combustion chamber.

wherein a spacing between a channel access opening in the second piston rod portion and the second face of the piston and the location of the exhaust outlet are configured such that compression of gases within the second combustion chamber occurs when the piston is in a position past the exhaust outlet toward the second end of the second combustion chamber and the channel access opening in the second piston rod portion is outside of the second combustion chamber.

wherein a spacing between a channel access opening in the second piston rod portion and the second face of the piston and the location of the exhaust outlet are configured such that scavenging of combustion gases from the second combustion chamber occurs through the exhaust outlet when the channel access opening in the second piston rod portion is in the second combustion chamber and the piston is in a position past the exhaust outlet toward the first end of the first combustion chamber.

wherein a spacing between a channel access opening in the second piston rod portion and the second face of the piston and the location of the exhaust outlet is configured such that gas boost in the second combustion chamber follows scavenging of combustion gases from the second combustion chamber as pre-charged air continues to be introduced through the channel access opening in the second piston rod portion into the second combustion chamber.

wherein a spacing between a channel access opening in the first piston rod portion and the first face of the piston and the location of the exhaust outlet is configured such that compression of gases within the first combustion chamber occurs when the piston is in a position past the exhaust toward the first end of the first combustion chamber and the access opening in the first piston rod portion is outside of the first combustion chamber.

wherein a compression ratio of the engine is a function of at least one of a closest spacing between a channel access opening in the first piston rod portion and the first face of the double-faced piston, and the closest spacing between a channel access opening in the second piston rod portion and the second face of the double-face piston.

A piston for an internal combustion engine, the piston including a cylindrical first piston portion having a first diameter, a cylindrical second piston portion of the first diameter, a cylindrical third piston portion of a second diameter less than the first diameter, and located between the first piston portion and the second piston portion, and wherein the first piston portion is configured such that prior to assembly, the first piston portion is separate from the second piston portion, a continuous, gapless piston ring circumscribing the third piston portion, where the piston ring is configured such that when heated the piston ring deforms in an axial direction of the piston.

wherein the third piston portion defines a slot between the first piston portion and the second piston portion.

wherein, prior to assembly, the third piston portion is integral with the first piston portion, and the second piston portion is non-integral with the third piston portion.

a groove in the outer peripheral wall of the piston the groove having a first edge and a second edge spaced from the first edge.

a piston ring in the groove, the piston ring having a shape that meanders within the groove, such that the shape of the piston ring differs from a shape of the groove and such that the piston ring does not substantially fill the groove, and wherein the piston ring is constructed of a material that when subjected to heat causes a shape of the meanderings to change, thereby enabling the piston ring to expand in an axial direction of the piston, between the edges of the groove.

wherein the meanderings are in the shape of a wave.

wherein peaks of the wave alternatively extend toward opposing edges of the groove.

wherein the piston ring is constructed such that when subjected to heat, the piston ring tends to expand in an axial direction of the piston rather than radially.

wherein the piston ring has an undulating axial cross section and a circular radial cross section.

wherein the piston ring includes a plurality of staggered, flat abutment surface portions on axially opposite faces.

wherein the flat abutment surface portions are configured to seat alternately on opposite edges of the groove.

wherein a gap between the first and second edges of the groove allows for axially-directed expansion and contraction of the piston ring while maintaining a circular radial cross section of the piston ring having a substantially constant outer diameter.

wherein the piston ring is formed with an undulating axial cross section including a plurality of staggered, flat abutment surface portions on axially opposite faces thereof, the flat abutment surface portions being configured to seat alternately on the first and second edges of the groove with portions of the piston ring in between the flat abutment surface portions being spaced from the edges of the groove.

a piston formed of an assembly of separate pieces including a pair of piston end disks each having a first outer diameter, a piston center disk having a second outer diameter smaller than the first outer diameter, and wherein the center disk is configured to cause a thermal gap between the pair of piston end disks.

further including the piston center disk having a hardness that is different from the piston end disks.

wherein the piston center disk is integrally formed with one of the pair of piston end disks.

Various alterations and modifications may be made to the disclosed exemplary embodiments without departing from the spirit or scope of the disclosure as embodied in the following claims. For example, the burned gases produced by the engine 10 may be used for driving a turbo charger. The compressed air introduced into the cylinder may be pressurized by an external compressor that is driven by the reciprocating piston rod portions extending from opposite ends of the cylinder. Other variations may include imparting a swirl effect to the gases introduced into the cylinder by changing the angle of the inlet ports and of the outlet ports so that gases are not directed radially into or out of the cylinder.

What is claimed is:

1. A linear reciprocating engine, comprising:
an engine block;
a cylinder within the engine block, the cylinder having a first combustion chamber and an opposing second combustion chamber on opposing ends thereof;
a double-faced piston slidably mounted within the cylinder, the double-faced piston including a first face and a second face;
a first piston rod portion extending from the first face of the double-faced piston through a first end of the first combustion chamber;
a second piston rod portion extending from the second face of the piston through a second end of the second combustion chamber;
an exhaust outlet in a peripheral wall of the cylinder in a region generally central between the first combustion chamber and the second combustion chamber;
a plurality of cooling fins circumferentially attached to an outer surface of the cylinder and disposed between the first end of the first combustion chamber and the second end of the second combustion chamber, wherein the plurality of cooling fins are in thermal contact with the cylinder to transfer heat generated inside the first and second combustion chambers to outside of the cylinder;
a first elongated channel in the first piston rod portion configured to serve as a first intake inlet for gas from a first location external to the cylinder, through the first end of the first combustion chamber to a location within the first combustion chamber; and
a second elongated channel in the second piston rod portion configured to serve as a second intake inlet for gas from a second location external to the cylinder, through the second end of the second combustion chamber to a location within the second combustion chamber;

wherein a length of the double-faced piston, a length of the cylinder, a location of the exhaust outlet, and a location of a channel access opening in each of the first and second piston rod portions are arranged such that when the piston is in a combustion stage in the first combustion chamber, the piston blocks the exhaust outlet from communicating with the first combustion chamber and the channel access opening in the first piston rod portion is outside of the first combustion chamber, while simultaneously the exhaust outlet is in fluid communication with the second combustion chamber, and the channel access opening in the second piston rod portion is within the second combustion chamber, and the length of the double-faced piston is less than or equal to ½ of a distance traveled by the double-faced piston from at least one of the first end of the first combustion chamber to the exhaust outlet and the second end of the second combustion chamber to the exhaust outlet.

2. The engine according to claim 1, wherein a spacing between the channel access opening in the first piston rod portion and the first face of the piston and the location of the exhaust outlet are configured such that scavenging of combustion gases from the first combustion chamber occurs through the exhaust outlet when the channel access opening in the first piston rod portion is located within the first combustion chamber and the piston is in a position on the second combustion chamber side of the exhaust outlet.

3. The engine according to claim 1, wherein a spacing between the channel access opening in the first piston rod portion and the first face of the piston and the location of the exhaust outlet are configured such that gas boost in the first combustion chamber follows scavenging of combustion gases from the first combustion chamber as pre-charged air continues to be introduced through the channel access opening in the first piston rod portion into the first combustion chamber.

4. The engine according to claim 1, wherein a spacing between the channel access opening in the second piston rod portion and the second face of the piston and the location of the exhaust outlet are configured such that compression of gases within the second combustion chamber occurs when the piston is in a position past the exhaust outlet toward the second end of the second combustion chamber and the channel access opening in the second piston rod portion is outside of the second combustion chamber.

5. The engine according to claim 1, wherein a spacing between the channel access opening in the second piston rod portion and the second face of the piston and the location of the exhaust outlet are configured such that scavenging of combustion gases from the second combustion chamber occurs through the exhaust outlet when the channel access opening in the second piston rod portion is in the second combustion chamber and the piston is in a position past the exhaust outlet toward the first end of the first combustion chamber.

6. The engine according to claim 1, wherein a spacing between the channel access opening in the second piston rod portion and the second face of the piston and the location of the exhaust outlet are configured such that gas boost in the second combustion chamber follows scavenging of combustion gases from the second combustion chamber as pre-charged air continues to be introduced through the channel access opening in the second piston rod portion into the second combustion chamber.

7. The engine according to claim 1, wherein a spacing between the channel access opening in the first piston rod portion and the first face of the piston and the location of the exhaust outlet are configured such that compression of gases within the first combustion chamber occurs when the piston is in a position past the exhaust outlet toward the first end of the first combustion chamber and the access opening in the first piston rod portion is outside of the first combustion chamber.

8. The engine according to claim 1, wherein a compression ratio of the engine is a function of at least one of a closest spacing between the channel access opening in the first piston rod portion and the first face of the double-faced piston, and a closest spacing between a channel access opening in the second piston rod portion and the second face of the double-face piston.

* * * * *